(12) United States Patent
Sato et al.

(10) Patent No.: US 12,460,922 B2
(45) Date of Patent: Nov. 4, 2025

(54) SHEET IDENTIFICATION DEVICE AND IMAGE PROCESSING APPARATUS CAPABLE OF IDENTIFYING FIBER DIRECTION OF SHEET

(71) Applicant: KYOCERA Document Solutions Inc., Osaka (JP)

(72) Inventors: Koji Sato, Osaka (JP); Kazuhiro Nakachi, Osaka (JP); Rui Hamabe, Osaka (JP); Takuya Miyamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 261 days.

(21) Appl. No.: 18/255,846

(22) PCT Filed: Nov. 29, 2021

(86) PCT No.: PCT/JP2021/043676
§ 371 (c)(1),
(2) Date: Jun. 2, 2023

(87) PCT Pub. No.: WO2022/118799
PCT Pub. Date: Jun. 9, 2022

(65) Prior Publication Data
US 2024/0011769 A1 Jan. 11, 2024

(30) Foreign Application Priority Data

Dec. 4, 2020 (JP) .................................. 2020-201447
Dec. 4, 2020 (JP) .................................. 2020-201448

(51) Int. Cl.
*G01B 11/25* (2006.01)
*G06T 7/70* (2017.01)
*H04N 1/00* (2006.01)

(52) U.S. Cl.
CPC ............... *G01B 11/25* (2013.01); *G06T 7/70* (2017.01); *H04N 1/00726* (2013.01);
(Continued)

(58) Field of Classification Search
CPC ... G01B 11/25; G01B 11/303; G01B 11/2513; B41J 11/009; G06T 7/70;
(Continued)

(56) References Cited

U.S. PATENT DOCUMENTS

| | | | |
|---|---|---|---|
| 2004/0005157 A1 | 1/2004 | Akita | |
| 2010/0328649 A1* | 12/2010 | Ota | G01B 11/25 356/612 |
| 2016/0084819 A1* | 3/2016 | Raunio | G01N 21/8914 250/559.07 |

FOREIGN PATENT DOCUMENTS

| | | | | |
|---|---|---|---|---|
| CA | 1285788 C | * | 7/1991 | ............. G01N 21/21 |
| JP | H1023203 A | | 1/1998 | |
| JP | 2004038879 A | | 2/2004 | |

* cited by examiner

Primary Examiner — Jennifer D Bennett
(74) Attorney, Agent, or Firm — Alleman Hall & Tuttle LLP

(57) ABSTRACT

A sheet identification device includes a light irradiation portion. When forming an identification image, the light irradiation portion projects first pattern light (P11) and second pattern light (P12) having different dependences on a fiber direction of a surface of a sheet on an identification region (R1). The identification image is an image of the identification region (R1) of the surface of the sheet on which image formation or image reading is performed, which is used for identifying the fiber direction of the surface of the sheet.

15 Claims, 19 Drawing Sheets

(52) U.S. Cl.
CPC ..... *H04N 1/00734* (2013.01); *H04N 1/00755* (2013.01); *G06T 2207/30176* (2013.01); *H04N 1/00771* (2013.01); *H04N 2201/0094* (2013.01)

(58) Field of Classification Search
CPC ... G06T 2207/30176; G06T 7/62; G06T 7/73; H04N 1/00726; H04N 1/00734; H04N 1/00755; H04N 1/00771; H04N 2201/0094; G03G 15/5029
See application file for complete search history.

FIG.5
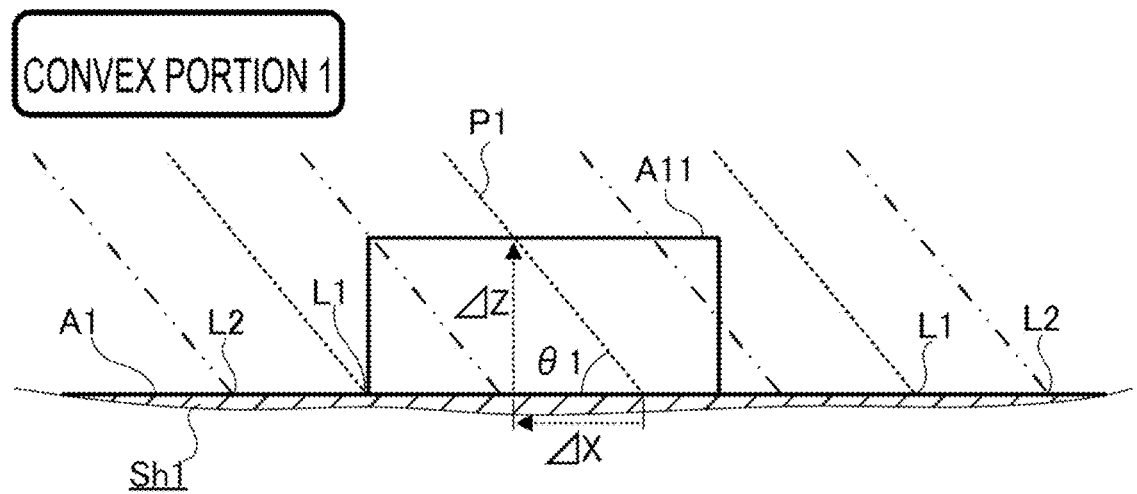
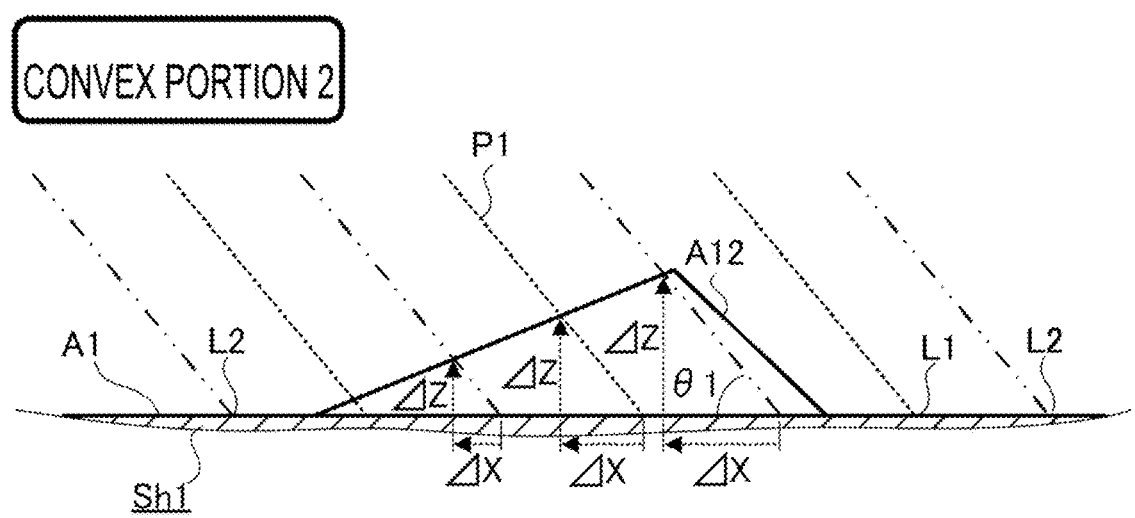

FIG.6
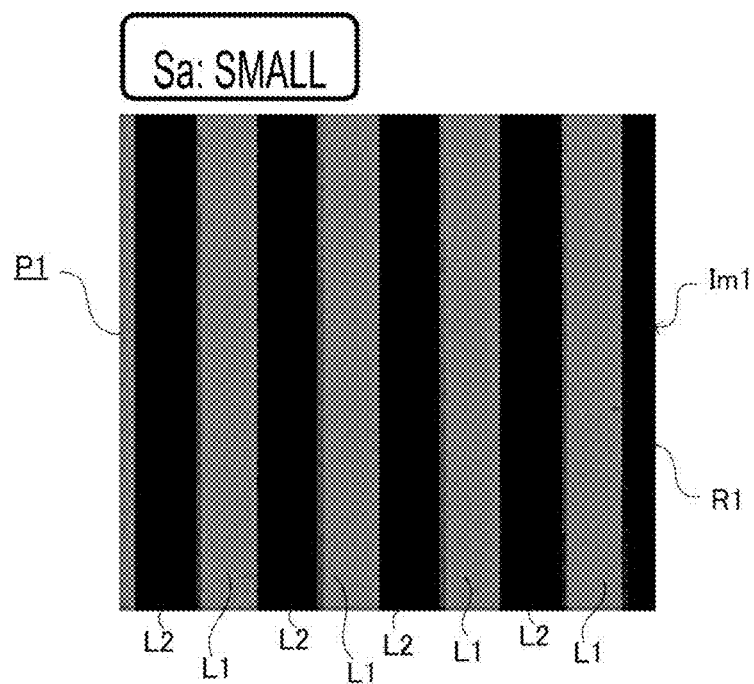
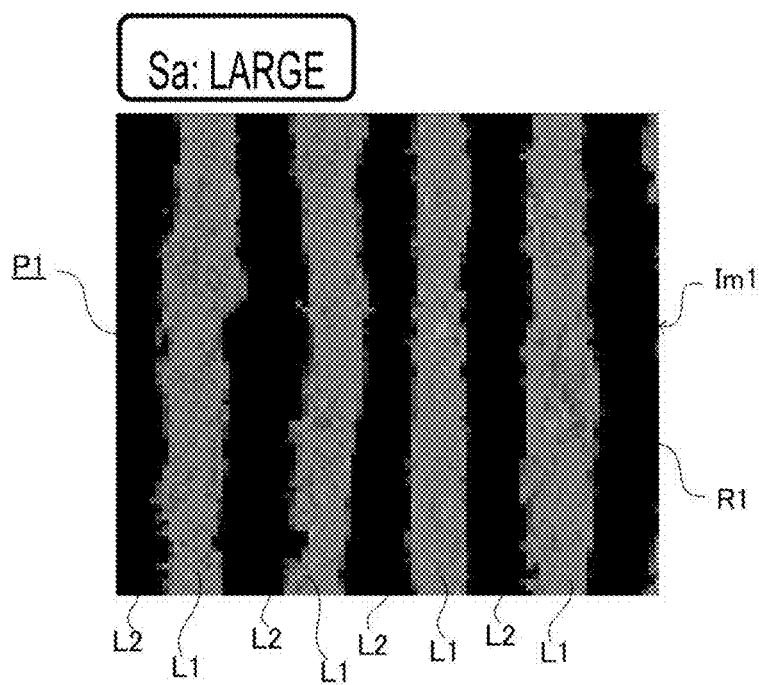

FIG.8
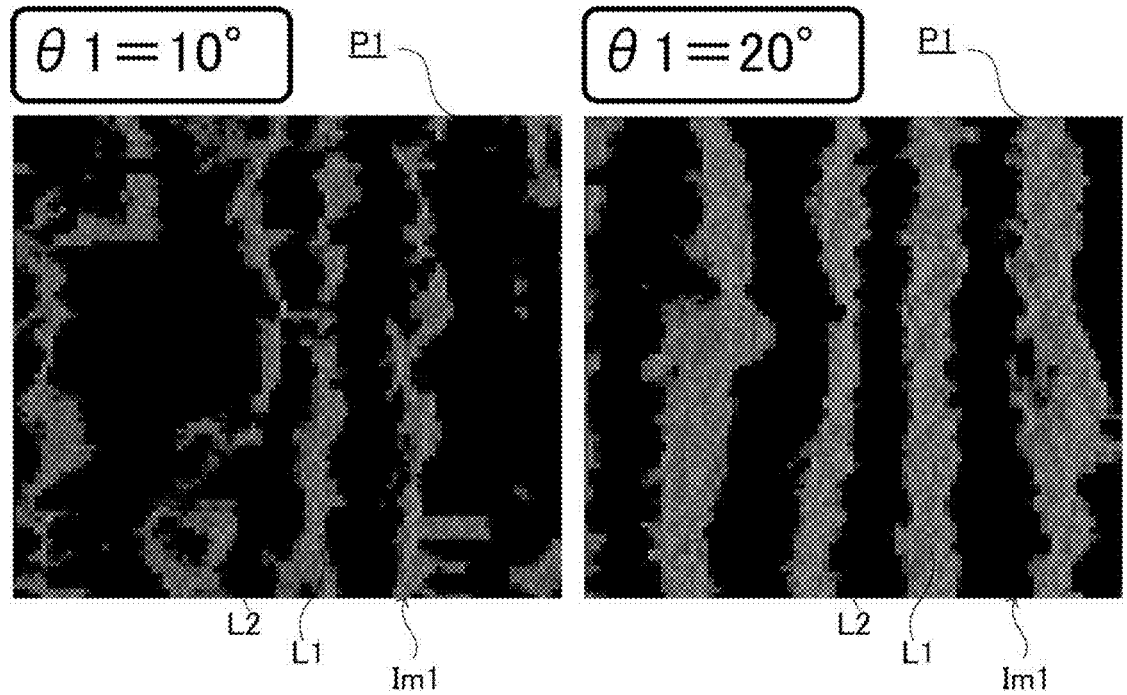
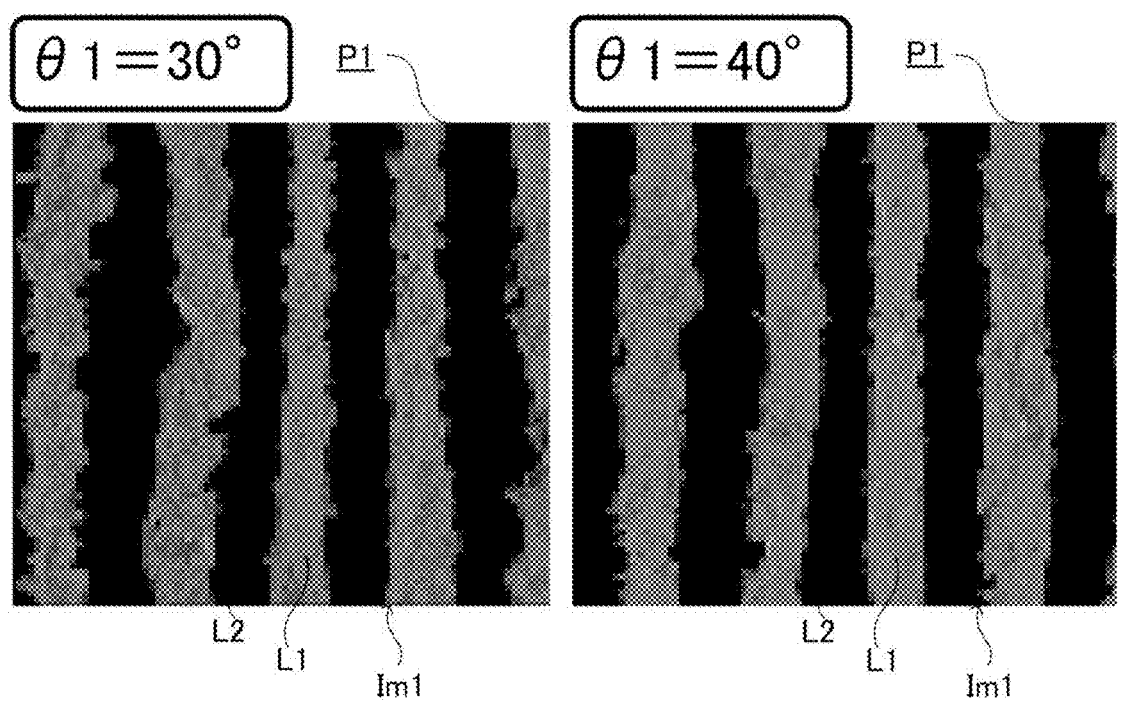

FIG.10

| WIDTH | θ1 | RELATIONSHIP BETWEEN IRRADIATION DIRECTION AND FIBER DIRECTION | $R^2$ OF STANDARD DEVIATION σ [pix.] |
|---|---|---|---|
| BRIGHT WIDTH200um, DARK WIDTH200um | 40° | SAME | 0.8956 |
| BRIGHT WIDTH200um, DARK WIDTH200um | 40° | 90° | 0.8523 |
| BRIGHT WIDTH160um, DARK WIDTH160um | 40° | SAME | 0.9151 |
| BRIGHT WIDTH160um, DARK WIDTH160um | 40° | 90° | 0.8927 |
| BRIGHT WIDTH120um, DARK WIDTH120um | 40° | SAME | 0.9651 |
| BRIGHT WIDTH120um, DARK WIDTH120um | 40° | 90° | 0.9112 |
| BRIGHT WIDTH100um, DARK WIDTH100um | 40° | SAME | 0.9658 |
| BRIGHT WIDTH100um, DARK WIDTH100um | 40° | 90° | 0.8892 |
| BRIGHT WIDTH80um, DARK WIDTH80um | 40° | SAME | 0.9684 |
| BRIGHT WIDTH80um, DARK WIDTH80um | 40° | 90° | 0.8494 |
| BRIGHT WIDTH60um, DARK WIDTH60um | 40° | SAME | 0.9132 |
| BRIGHT WIDTH60um, DARK WIDTH60um | 40° | 90° | 0.7868 |
| BRIGHT WIDTH40um, DARK WIDTH40um | 40° | SAME | 0.8326 |
| BRIGHT WIDTH40um, DARK WIDTH40um | 40° | 90° | 0.6635 |

FIG.17
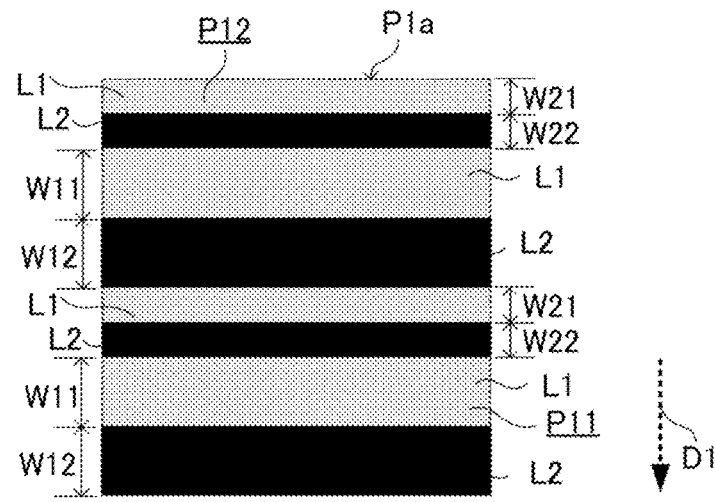
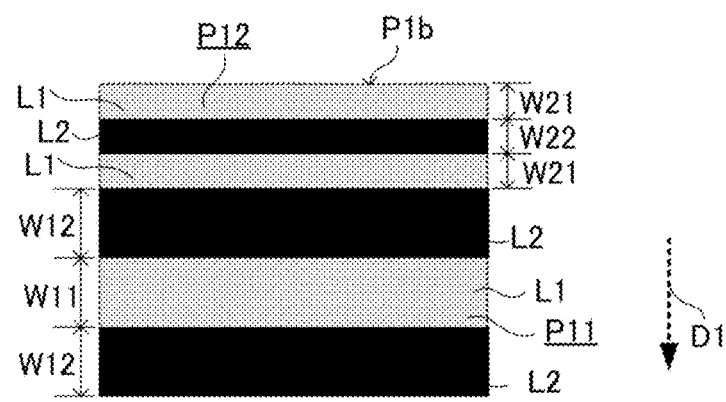
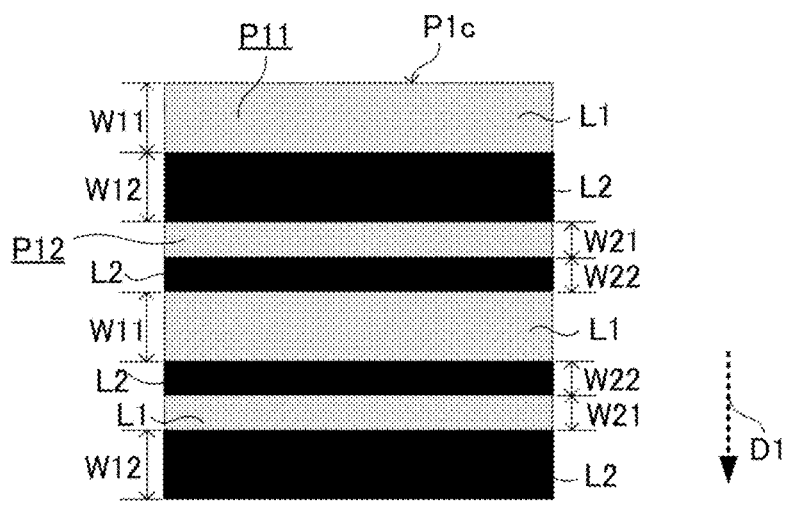

FIG.18
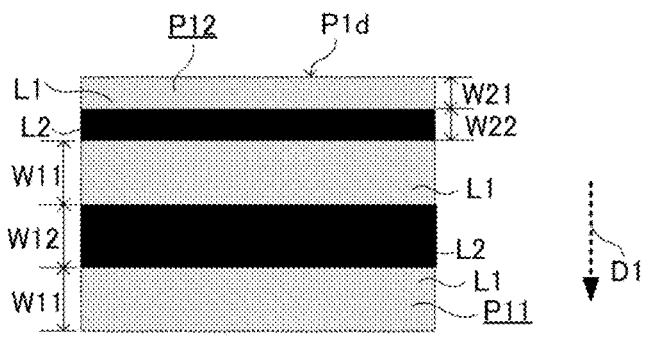
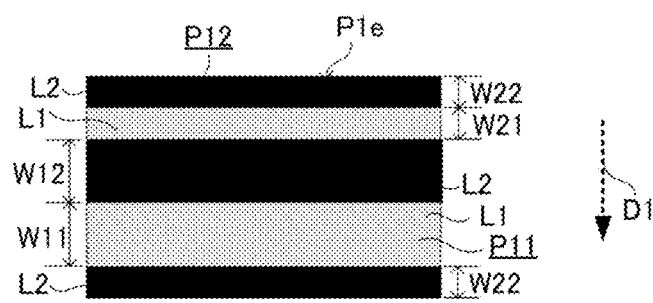
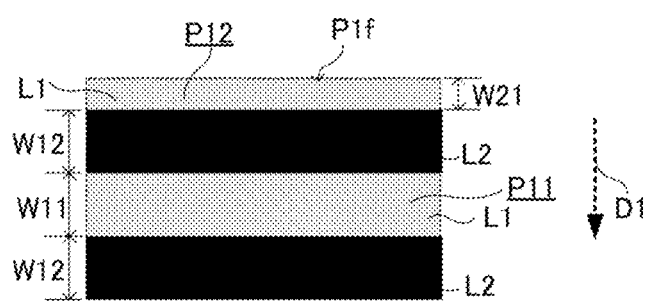
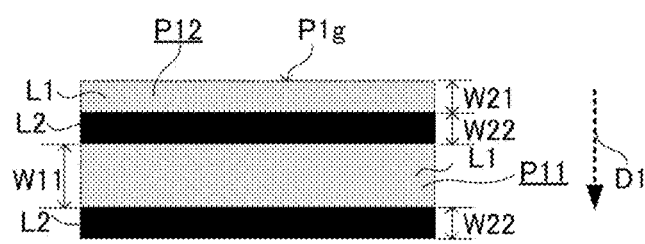

SHEET IDENTIFICATION DEVICE AND IMAGE PROCESSING APPARATUS CAPABLE OF IDENTIFYING FIBER DIRECTION OF SHEET

TECHNICAL FIELD

The present invention relates to a sheet identification device, an image processing apparatus, and a sheet identification method.

BACKGROUND

As a related technique, there is known a technique used in an image forming apparatus such as a copier or a laser printer, which automatically identifies the type of a sheet (paper) from an image of the surface of the sheet (see, for example, Patent Literature 1). An image reading apparatus according to the related technique is provided with a light emitting element that obliquely irradiates the surface of the sheet with light, and an area sensor that reads the irradiation region as an image, and reads information on the sheet from the reading result.

In this image reading apparatus, the surface roughness of the sheet is estimated by detecting a shadow image caused by the asperities on the surface of the sheet from the image of the light application area. When the asperities on the surface of the sheet are large, the contrast is higher than when the asperities are small, so that the magnitude of the asperities on the surface can be estimated from the contrast. Further, this image reading apparatus is configured to set the incident direction of the light from the light emitting element at an angle of 45 degrees with respect to the conveying direction of the sheet so as to maintain the fiber direction of the sheet and the incident direction of the light at an angle of approximately 45 degrees and reduce the variation in the detection accuracy depending on the fiber direction.

CITATION LIST

Patent Literature

Patent Literature 1: Japanese Unexamined Patent Application Publication No. 2004-038879

SUMMARY OF INVENTION

Technical Problem

However, it is difficult to identify the fiber direction of the sheet with the configuration of the related technique described above because the magnitude of the asperities is estimated while ignoring the influence of the fiber direction of the sheet in this configuration.

An object of the present invention is to provide a sheet identification device and an image processing apparatus which can easily identify the fiber direction of the sheet.

Solution to Problem

A sheet identification device according to an aspect of the present invention includes a light irradiation portion. When forming an identification image, the light irradiation portion projects first pattern light and second pattern light having different dependences on a fiber direction on an identification region. The identification image is an image of the identification region on a surface of a sheet on which image formation or image reading is performed, which is used for identifying the fiber direction of the surface of the sheet.

An image processing apparatus according to another aspect of the present invention includes the sheet identification device and an image processing portion. The image processing portion executes at least one of the image formation and the image reading on the sheet.

Advantageous Effects of Invention

According to the present invention, it is possible to provide a sheet identification device and an image processing apparatus which can easily identify the fiber direction of the sheet.

BRIEF DESCRIPTION OF THE DRAWINGS

FIG. 5 is a schematic diagram showing the principle of sheet surface asperity detection in the sheet identification device according to the first embodiment.

FIG. 6 is a diagram showing an example of an identification image obtained in the sheet identification device according to the first embodiment.

FIG. 8 is a diagram showing an example of the identification image when a predetermined angle obtained in the sheet identification device according to the first embodiment is changed.

FIG. 10 is a table showing the results of calculating the determination coefficient while changing the line width of pattern light and the relationship between the irradiation direction of the pattern light and the fiber direction in the sheet identification device according to the first embodiment.

FIG. 17 is a schematic diagram showing one mode of pattern light used in the sheet identification device according to the first embodiment.

FIG. 18 is a schematic diagram showing one mode of pattern light used in the sheet identification device according to the first embodiment.

DETAILED DESCRIPTION

Embodiments of the present invention will be described below with reference to the accompanying drawings. The following embodiments are examples of embodying the present invention and do not limit the technical scope of the present invention.

First Embodiment

[1] Overall Configuration of Image Processing Apparatus

First, an overall configuration of an image processing apparatus 10 according to the present embodiment will be described with reference to FIG. 1 and FIG. 2.

The image processing apparatus 10 according to the present embodiment is a multifunction peripheral having a plurality of functions such as a scanning function for reading an image (image data) from a document sheet, a printing function for forming an image based on the image data, a facsimile function, and a copy function. The image processing apparatus 10 may be a printer, a scanner, a facsimile machine, a copier, or the like as long as it has an image processing function including at least one of a function of forming an image and a function of reading an image.

Figure 1:
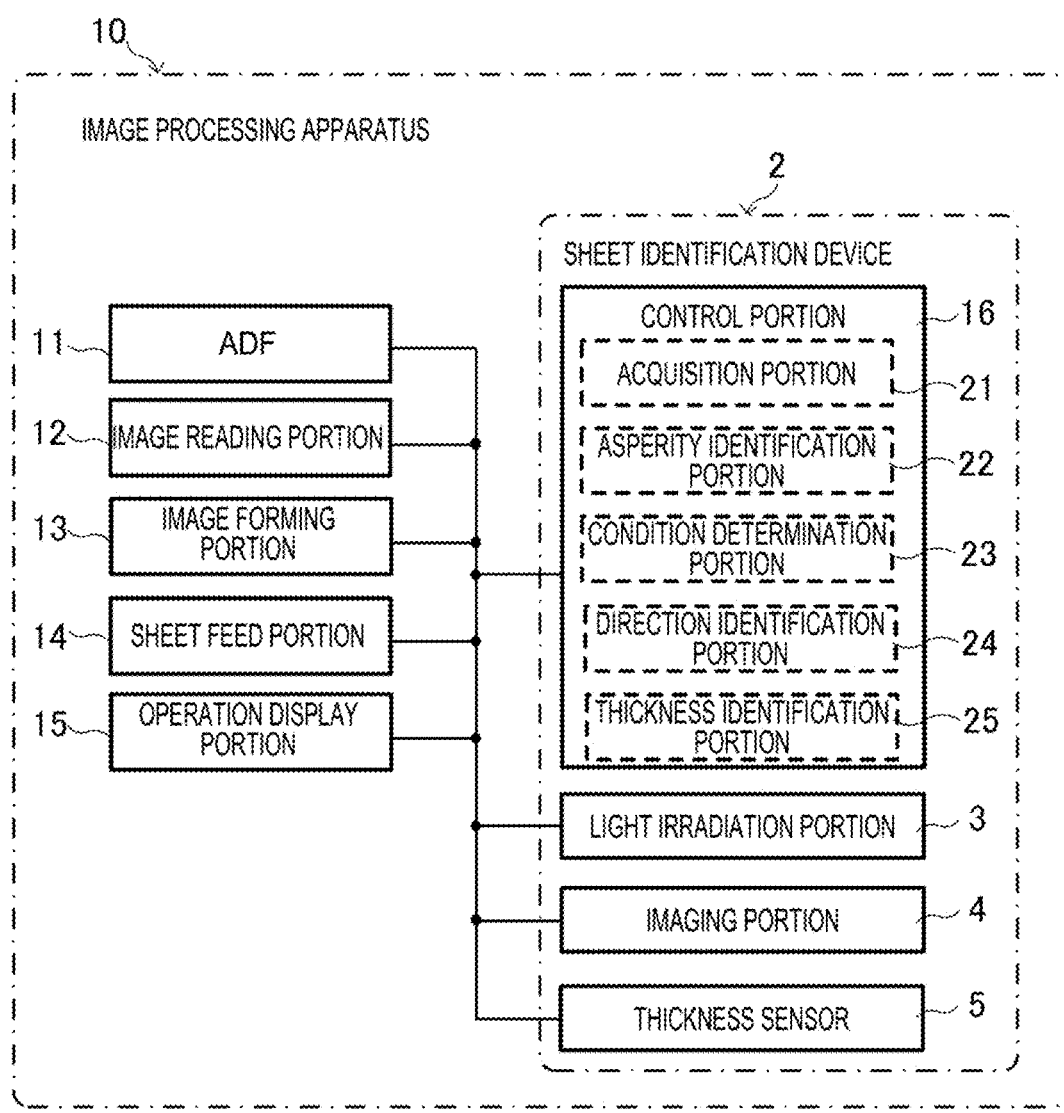
FIG. 1 is a schematic block diagram of an image processing apparatus according to a first embodiment.

As shown in FIG. 1, the image processing apparatus 10 includes an automatic document conveying device 11, an image reading portion 12, an image forming portion 13, a sheet feed portion 14, an operation display portion 15, and a control portion 16. Since the automatic document conveying device 11 is an auto document feeder (ADF), it is indicated as "ADF" in FIG. 1 and referred to as an "ADF 11" in the following description. In the present embodiment, as shown in FIG. 2, the image processing apparatus 10 includes a housing 100. The ADF 11, the image reading portion 12, the image forming portion 13, the sheet feed portion 14, the operation display portion 15, and the control portion 16 are provided in the housing 100.

The ADF 11 conveys a sheet (document sheet) whose image is read by the image reading portion 12. The ADF 11 includes a document sheet loading portion, a plurality of conveying rollers, a document sheet holder, a sheet discharge portion, and the like.

The image reading portion 12 reads an image from a sheet and outputs image data corresponding to the read image. The image reading portion 12 includes a document sheet table, a light source, a plurality of mirrors, an optical lens, a charge coupled device (CCD), and the like.

Figure 2:
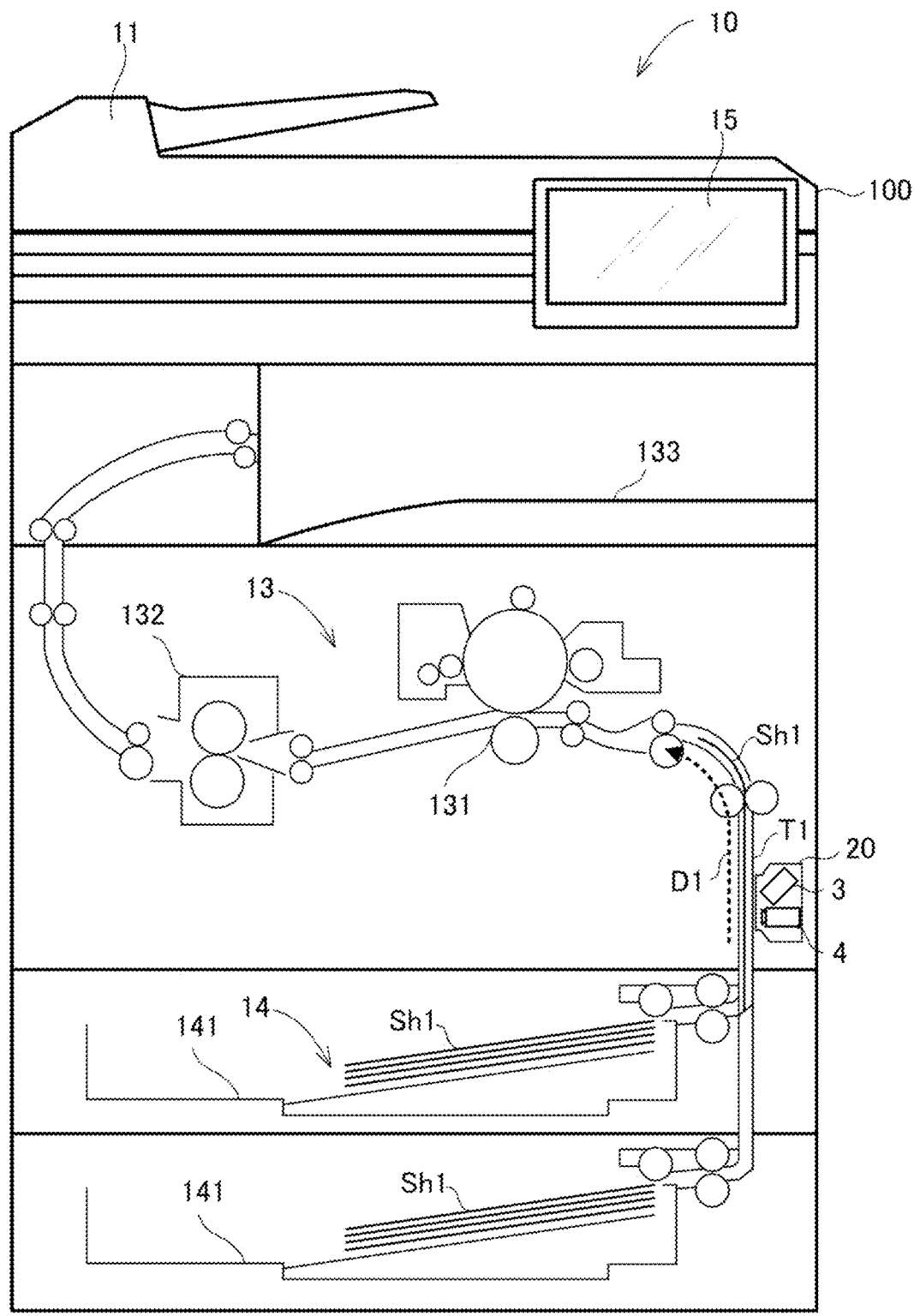
FIG. 2 is a schematic diagram showing the exterior and internal configuration of the image processing apparatus according to the first embodiment.

The image forming portion 13 forms an image on a sheet Sh1 based on the image data output from the image reading portion 12 (see FIG. 2). In addition, the image forming portion 13 forms an image on a sheet Sh1 based on image data input from an information processing apparatus, such as a personal computer, external to the image processing apparatus 10. In the present embodiment, as an example, as shown in FIG. 2, the image forming portion 13 includes a transfer device 131, a fixing device 132, a sheet discharge tray 133, and the like, and forms an image on a sheet Sh1 using an electrophotographic method. The image forming portion 13 is not necessarily configured to form only monochrome images, and may be configured to form full-color images using four colors of C (cyan), M (magenta), Y (yellow), and K (black). In addition, the image forming portion 13 may form an image on a sheet using an image forming method other than the electrophotographic method, such as an inkjet method.

The image forming portion 13 forms an image on a sheet Sh1 using toner as a developer. Specifically, the image forming portion 13 forms an electrostatic latent image on a charged surface of the photoconductor drum by irradiating the surface with a laser beam, and forms a toner image on the surface of the photoconductor drum by developing the electrostatic latent image with toner. The transfer device 131 transfers the toner image to the sheet Sh1 conveyed through a conveying path T1 (see FIG. 2). The fixing device 132 melts and fixes the toner image transferred to the sheet Sh1 onto the sheet Sh1. For example, the fixing device 132 includes a fixing roller and a pressure roller, and heats the toner image transferred to the sheet Sh1 and presses the sheet Sh1, thereby fixing the toner image onto the sheet Sh1. The sheet Sh1 on which the image has been formed is discharged to the sheet discharge tray 133. When the image forming portion 13 forms an image using an inkjet method, ink (another example of the developer) is supplied instead of the toner.

The sheet feed portion 14 supplies the sheet Sh1 to the image forming portion 13. The sheet feed portion 14 includes a plurality of sheet feed cassettes 141, a manual feed tray, and a plurality of conveying rollers. The sheet feed portion 14 conveys the sheet Sh1 from the plurality of sheet feed cassettes 141, the manual feed tray, or the like through the conveying path T1 by the plurality of conveying rollers and the like to supply the sheet Sh1 to the image forming portion 13. The image forming portion 13 forms an image on the sheet Sh1 supplied from the sheet feed portion 14 through the conveying path T1.

The operation display portion 15 is a user interface in the image processing apparatus 10. The operation display portion 15 includes a display portion, such as a liquid crystal display, for displaying various types of information in response to a control instruction from the control portion 16, and an operation portion, such as a switch or a touch panel, for inputting various types of information to the control portion 16 in response to a user's operation. In addition, the image processing apparatus 10 may include, as a user interface, an audio output portion, an audio input portion, and the like, in addition to or instead of the operation display portion 15.

The control portion 16 comprehensively controls the image processing apparatus 10. The control portion 16 is mainly composed of a computer system including one or more processors and one or more memories. In the image processing apparatus 10, the functions of the control portion 16 are realized by one or more processors executing programs. The programs may be stored in advance in the one or more memories, may be provided through a telecommunications line such as the Internet, or may be provided by being stored in on a non-transitory recording medium readable by the computer system, such as a memory card or an optical disk. The one or more processors are composed of one or more electronic circuits, including a semiconductor integrated circuit. Further, the computer system in the present disclosure includes a microcontroller having one or more processors and one or more memories. The control portion 16 may be a control portion provided separately from the main control portion which comprehensively controls the image processing apparatus 10.

In addition, the image processing apparatus 10 further includes a storage portion, a communication portion, a power supply portion, and the like. The storage portion includes one or more nonvolatile memories, and stores in advance information, such as control programs, for causing the control portion 16 to execute various types of processing. The communication portion is an interface that executes data communication between the image processing apparatus 10 and an external apparatus connected via a communication network such as the Internet or a local area network (LAN). The power supply portion is a power supply circuit that generates (outputs) electric power for the operation of the image processing apparatus 10.

As a technique related to this type of image processing apparatus 10, there is known a technique which is used in an image forming apparatus such as a copier or a laser printer to automatically identify the type of a sheet (paper) from an image of the surface of the sheet. An image reading apparatus according to the related technique includes a light emitting element that obliquely irradiates the surface of the sheet with light, and an area sensor that reads the irradiation region as an image, and reads information on the sheet from the read result.

In this image reading apparatus, the surface roughness of the sheet is estimated by detecting a shadow image caused by the asperities on the surface of the sheet from the image of the light application area. When the asperities on the surface of the sheet are large, the contrast is higher than when the asperities are small, so that the magnitude of the asperities on the surface can be estimated from the contrast. Further, this image reading apparatus is configured to set the incident direction of the light from the light emitting element at an angle of 45 degrees with respect to the conveying direction of the sheet so as to maintain the fiber direction of the sheet and the incident direction of the light at an angle of approximately 45 degrees and reduce the variation in the detection accuracy depending on the fiber direction.

However, with the above-described configuration of the related technique, it is necessary to make the angle of the light incident direction with respect to the surface of the sheet shallow (small) in order to obtain an image having a high sensitivity to asperities, and thus the obtained image becomes dark as a whole, and the shadow caused by the asperities is easily buried in noise.

In contrast, in the present embodiment, the image processing apparatus 10 can easily improve the accuracy of identifying the asperities on the surface of the sheet with the configuration to be described below.

That is, as shown in FIG. 1, the image processing apparatus 10 according to the present embodiment includes a sheet identification device 2. The sheet identification device 2 according to the present embodiment is integrated with the image processing apparatus 10.

The sheet identification device 2 includes an acquisition portion 21 and an asperity identification portion 22. The acquisition portion 21 acquires an identification image Im1 (see FIG. 4). The identification image Im1 is an image of an identification region R1 (see FIG. 4) of the surface A1 (see FIG. 3) of the sheet Sh1 on which image formation or image reading is performed. The identification region R1 is a region on the surface A1 of the sheet Sh1 on which pattern light P1 (see FIG. 3) is projected. The asperity identification portion 22 identifies asperity information on the asperities on the surface A1 of the sheet Sh1 based on the identification image Im1. In the present embodiment, the acquisition portion 21 and the asperity identification portion 22, which are constituent elements of the sheet identification device 2, are provided in the control portion 16 as functions of the control portion 16.

With the above configuration, the sheet identification device 2 according to the present embodiment and the image processing apparatus 10 provided with the sheet identification device 2 have an advantage that the accuracy of identifying the asperities on the surface A1 of the sheet Sh1 can be easily improved. In other words, the identification region R1 of the surface A1 of the sheet Sh1 is not uniformly irradiated with the light from the light emitting element, but rather the pattern light P1 is projected thereon. Therefore, the asperity identification portion 22 can identify the asperity information on the asperities on the surface A1 of the sheet Sh1 from the degree of deformation or distortion of the pattern light P1 in the identification image Im1. Therefore, the asperity information can be identified from a relatively bright identification image Im1 without making the angle of the light incident direction with respect to the surface A1 of the sheet Sh1 shallow (small) as in the related technique, and as a result, the accuracy of identifying the asperities can be easily improved as compared with the related technique.

In addition, it is difficult to identify the fiber direction of the sheet with the configuration of the related technique described above because the magnitude of the asperities is estimated while ignoring the influence of the fiber direction of the sheet in this configuration.

In contrast, in the present embodiment, the image processing apparatus 10 can easily identify the fiber direction of the sheet with the configuration to be described below.

That is, in the present embodiment, the sheet identification device 2 includes a light irradiation portion 3 (see FIG. 1). When forming the identification image Im1, the light irradiation portion 3 projects first pattern light P11 (see FIG. 12) and second pattern light P12 (see FIG. 12) having different dependences on the fiber direction of the surface A1 of the sheet Sh1 on the identification region R1. The identification image Im1 is an image of the identification region R1 of the surface A1 of the sheet Sh1 on which image formation or image reading is performed, which is used for identifying the fiber direction of the surface A1 of the sheet Sh1. In this way, the identification region R1 of the surface A1 of the sheet Sh1 is not uniformly irradiated with the light from the light emitting element, but rather the pattern light P1 (first pattern light P11 and second pattern light P12) is projected thereon. Accordingly, use of the dependence of the pattern light P1 on the fiber direction enables identification of the fiber direction from the identification image Im1. Therefore, the configuration of the present embodiment has an advantage that the fiber direction of sheet Sh1 can be easily identified.

In the present embodiment, the sheet identification device 2 includes a direction identification portion 24 (see FIG. 1) in addition to the acquisition portion 21. The direction identification portion 24 identifies the fiber direction of the surface A1 of the sheet Sh1 based on the identification image Im1. The identification image Im1 is an image of the identification region R1 on which pattern light P1 is projected of the surface A1 of the sheet Sh1. In the present embodiment, the acquisition portion 21 and the direction identification portion 24, which are constituent elements of the sheet identification device 2, are provided in the control portion 16 as functions of the control portion 16. In this way, the identification region R1 of the surface A1 of the sheet Sh1 is not uniformly irradiated with the light from the light emitting element, but rather the pattern light P1 is projected thereon. Accordingly, use of the dependence of the pattern light P1 on the fiber direction enables identification of the fiber direction from the identification image Im1. Therefore, the configuration of the present embodiment has an advantage that the fiber direction of sheet Sh1 can be easily identified.

The method for identifying the fiber direction will be described in detail in the section of "[8] Fiber Direction Identification Method".

The sheet identification device 2 according to the present embodiment constitutes the image processing apparatus 10 together with the image processing portion (the image reading portion 12 and the image forming portion 13). In other words, the image processing apparatus 10 according to the present embodiment includes the sheet identification device 2 and an image processing portion that executes at least one of image formation and image reading on the sheet Sh1.

[2] Definitions

The "sheet" in the present disclosure is a sheet on which image formation or image reading is to be performed. In the present embodiment, as an example, it is assumed that the sheet Sh1 to be irradiated with the pattern light P1 is a sheet Sh1 on which image formation is to be performed by the image forming portion 13. That is, in the present embodiment, the sheet Sh1 conveyed through the conveying path T1 by the sheet feed portion 14 is to be irradiated with the pattern light P1. However, the present disclosure is not limited to this example, and the sheet to be irradiated with the pattern light P1 may be the sheet (document sheet) on which image reading is to be performed by the image reading portion 12, that is, the sheet conveyed by the ADF 11. In addition, although the sheet Sh1 is paper as an example in the present embodiment, it is not limited to paper, and may be, for example, a resin film.

The "pattern light" in the present disclosure is, for example, light that is projected from a light irradiation portion 3 (see FIG. 1) onto a projection surface (here, the surface A1 of the sheet Sh1) in a controlled shape and direction, and is so-called structured light. That is, the region (identification region R1) irradiated with the pattern light P1 is not uniformly irradiated with the pattern light P1, but a figure, a design, a picture, a pattern, a symbol, a character, a number, or the like corresponding to the pattern light P1 is projected thereon. Specifically, by irradiating the identification region R1 with the pattern light P1, a luminance distribution of a pattern corresponding to the pattern light P1, such as a stripe pattern, a lattice pattern, or an arc pattern, is produced in the identification region R1. Further, the pattern light P1 is not limited to a fixed pattern such as a still image, and a luminance distribution of a pattern that changes with time such as a moving image (including an animation) may be produced in the identification region R1.

The "identification image" in the present disclosure is, for example, an image of the identification region R1 on which the pattern light P1 is projected, which is captured by an imaging portion 4. That is, the identification image Im1 includes the pattern light P1 projected onto the identification region R1, or more strictly, a luminance distribution of a pattern corresponding to the pattern light P1 produced in the identification region R1 by projecting the pattern light P1 on the identification region R1. The identification image Im1 may be either a monochrome image or a color image, and may be either a still image or a moving image.

The "asperity information" in the present disclosure is information on the asperities on the surface A1 of the sheet Sh1, and includes information such as the height (or depth) of the asperities and/or the size of the asperities in plan view. The surface (A1) of the sheet (Sh1) has asperities including at least one of a concave portion and a convex portion. That is, the surface A1 may include only a plurality of concave portions or a plurality of convex portions. Further, the surface A1 may include a plurality of concave portions and one convex portion. In this case, as an example, the surface A1 includes one net-like convex portion and a plurality of concave portions consisting of mesh portions surrounded by this convex portion. Similarly, as an example, the surface A1 may include one net-like concave portion and a plurality of convex portions consisting of mesh portions surrounded by this concave portion.

The asperities (concave portions and convex portions) of the surface A1 have extremely small sizes that cannot be individually identified with the naked eye, and the surface A1 of one sheet Sh1 includes a large number of asperities. That is, the asperities are microscopic compared to the entire surface A1, and when a person looks at the surface A1, the asperities make the surface A1 look like a rough "satin finish". Such a large number of microscopic asperities are formed, for example, by a large number of fibers constituting paper when the sheet Sh1 is paper, or by embossing or the like when the sheet Sh1 is a resin film. Information on such microscopic asperities includes an index representing surface roughness, such as an arithmetic average height (Sa) or an arithmetic average height of lines (Ra).

The "fiber direction" in the present disclosure is the direction of the fibers on the surface A1 of the sheet Sh1, and is, for example, the extending direction of a large number of fibers constituting paper when the sheet Sh1 is paper, i.e., the paper grain direction. Generally, the sheet Sh1 has a "long grain" in which the fiber direction is along the long side of the sheet Sh1, and a "short grain" in which the fiber direction is along the short side of the sheet Sh1. The conveying direction D1 (see FIG. 2) of the sheet Sh1 in the image processing apparatus 10 is a direction along the long side or the short side of the sheet Sh1. Therefore, basically, the fiber direction is along the conveying direction D1 of the sheet Sh1 or along a direction orthogonal to the conveying direction D1.

[3] Sheet Identification Device

Next, a configuration of the sheet identification device 2 according to the present embodiment will be described in more detail with reference to FIG. 1 to FIG. 4.

In the present embodiment, the sheet identification device 2 includes an acquisition portion 21, an asperity identification portion 22, a condition determination portion 23, a direction identification portion 24, a thickness identification portion 25, a light irradiation portion 3, an imaging portion 4, and a thickness sensor 5. The acquisition portion 21, the asperity identification portion 22, the condition determination portion 23, the direction identification portion 24, and the thickness identification portion 25 are provided in the control portion 16 as functions of the control portion 16. That is, in the present embodiment, the image processing apparatus 10 includes not only the acquisition portion 21, the asperity identification portion 22, but also the condition determination portion 23, the direction identification portion 24, and the thickness identification portion 25, as functions of the control portion 16.

The light irradiation portion 3 irradiates the surface A1 of the sheet Sh1 with the pattern light P1. That is, the light irradiation portion 3 generates pattern light P1 whose shape and direction are controlled, and irradiates the surface A1 of the sheet Sh1 with the pattern light P1, thereby projecting the pattern light P1 on the identification region R1 of the surface A1 of the sheet Sh1. With such pattern light P1 from the light irradiation portion 3, a figure, a design, a picture, a pattern, a symbol, a character, a number, or the like corresponding to the pattern light P1 is projected on the identification region R1 of the surface A1 of the sheet Sh1.

Figure 4:
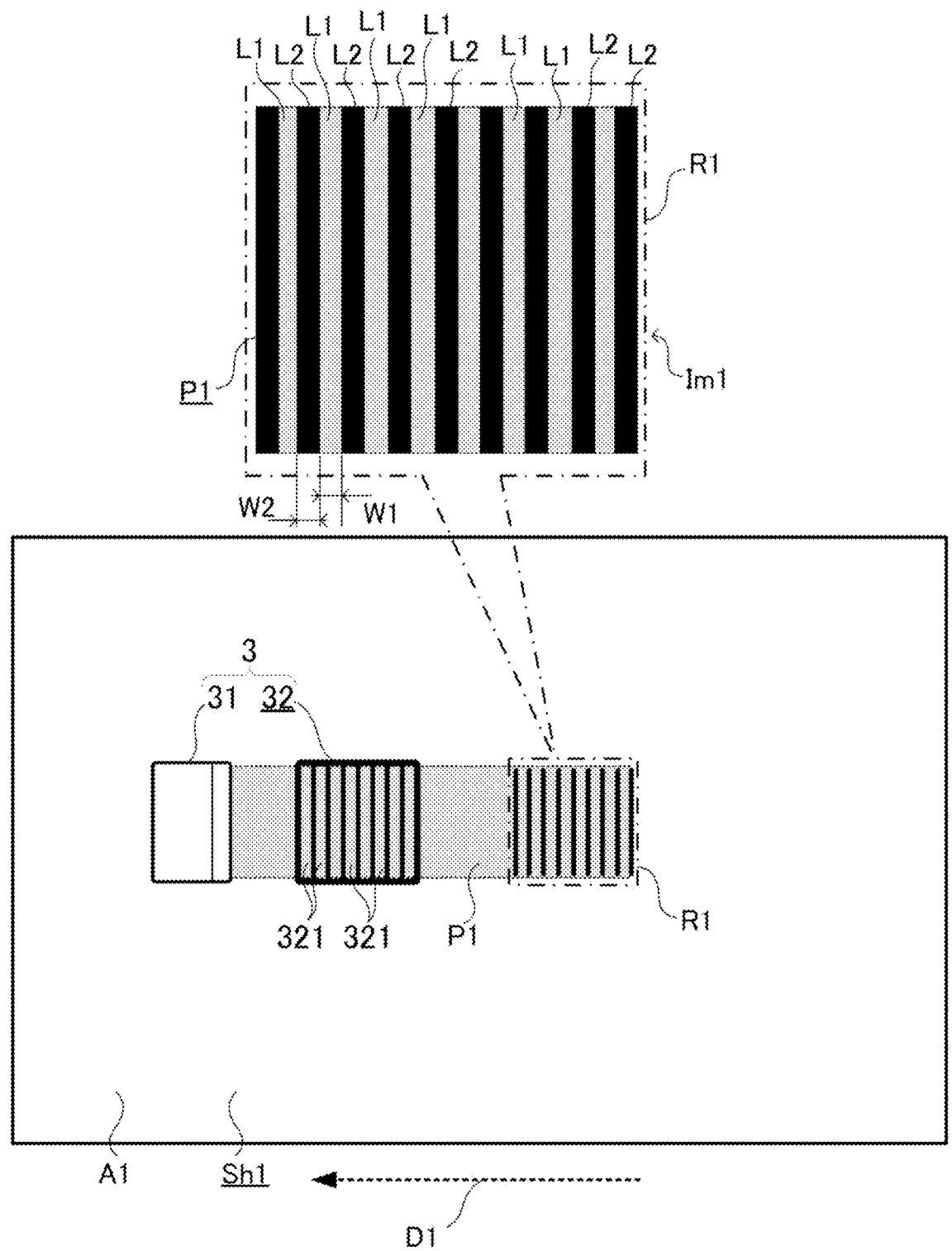
FIG. 4 is a schematic diagram showing a sheet and the light irradiation portion of the sheet identification device according to the first embodiment.

In the present embodiment, as an example, the pattern light P1 forms a stripe pattern in which a bright portion L1 and a dark portion L2 are alternately arranged on the identification region R1, as shown in FIG. 4. That is, the projection of the pattern light P1 produces a luminance distribution of a stripe pattern including the bright portions L1 and the dark portions L2 on the identification region R1. Here, the bright portions L1 are regions brighter than the dark portions L2, and in other words, the stripe pattern is a pattern in which a plurality of bright portions L1 are arranged at intervals or a pattern in which a plurality of dark portions L2 are arranged at intervals. That is, in the identification region R1, the pattern light P1 is projected to form a stripe pattern in which a linear bright portion L1 and a linear dark portion L2 are alternately arranged in a direction orthogonal to the longitudinal directions of the linear bright portion L1 and the linear dark portion L2. In the present embodiment, as an example, a linear bright portion L1 and a linear dark portion L2, which are orthogonal to the conveying direction D1 of the sheet Sh1, are arranged alternately in the conveying direction D1. In FIG. 4 and the like, the bright portion L1 is indicated by shading (dot hatching), and the dark portion L2 is indicated by blackening. Thus, deformation, distortion, or the like according to the asperities on the surface A1 is likely to appear in the stripe pattern on the identification region R1. However, the pattern light P1 that produces the stripe pattern as shown in FIG. 4 is merely an example of the pattern light P1, and the pattern light P1 can be changed as appropriate.

Figure 3:
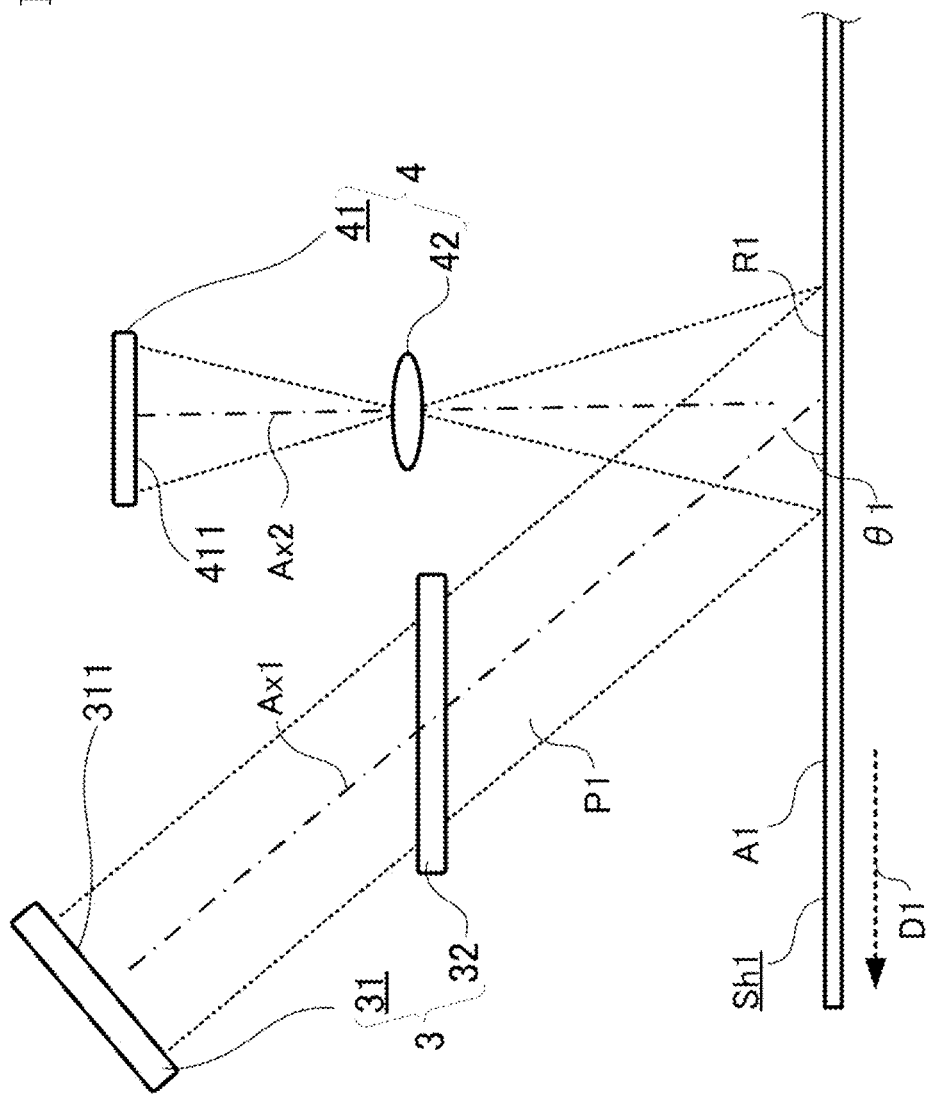
FIG. 3 is a schematic diagram showing a light irradiation portion and an imaging portion of a sheet identification device according to the first embodiment.

In the present embodiment, as shown in FIG. 3 and FIG. 4, the light irradiation portion 3 includes a light source 31 and a shield 32. The shield 32 blocks part of the light output from the light source 31 to allow the pattern light P1 to pass therethrough. The light source 31 includes a light emitting element that emits light when electric power is supplied thereto, and outputs light generated by the light emitting element toward the shield 32. The light source 31 is controlled by a control signal from the control portion 16, and can be switched on/off at least at the control portion 16. The shield 32 is disposed between the light source 31 and the identification region R1 of the surface A1 of the sheet Sh1, and is a component that blocks part of the light from the light source 31 and allows the rest to pass therethrough. Thus, part of the light output from the light source 31 is blocked by the shield 32, and the rest passes through the shield 32, so that the light that has passed through the shield 32 becomes pattern light P1 controlled to have a desired shape by the shield 32. Thus, the pattern light P1 can be realized with a relatively simple configuration.

In the present embodiment, as an example, the light source 31 has one or more light emitting elements such as a light emitting diode (LED) or an organic electroluminescence (EL), and makes the entire light emitting surface 311 (see FIG. 3) in a rectangular shape in plain view to substantially uniformly emit light to perform surface emission. Further, in the present embodiment, the light source 31 outputs parallel light or light close to parallel light. Therefore, the optical axis Ax1 of the pattern light P1 output from the light irradiation portion 3 (see FIG. 3) is a perpendicular line of the light emitting surface 311 passing through the center (center of gravity) of the light emitting surface 311 of the light source 31. The light source 31 may have an optical component, such as a collimator lens, for converting the light from the light emitting element into parallel light. In the present embodiment, as an example, the light source 31 outputs visible light, specifically, white light. However, the light source 31 only has to output light having a wavelength to which the imaging portion 4 is sensitive, and may output light other than white light, or may output light in a wavelength range other than visible light, such as infrared light or ultraviolet light.

In the present embodiment, as an example, the shield 32 is a rectangular plate-shaped component that absorbs or reflects light from the light source 31, and has one or more slits 321 (see FIG. 4). Thus, part of the light output from the light source 31 is blocked by the shield 32, and the rest passes through the shield 32 through the slit 321 of the shield 32. In the present embodiment, in order to realize the pattern light P1 that forms a stripe pattern in the identification region R1, the shield 32 has a plurality of linear slits 321. Thus, in the identification region R1 irradiated with the pattern light P1, the light that has passed through the slit 321 becomes the bright portion L1, and the shadow of the shield 32 becomes the dark portion L2, so that the stripe pattern is projected. However, the present disclosure is not limited to the configuration in which the light that has passed through the slit 321 becomes the bright portion L1 as described above, and the pattern light P1 may be realized by, for example, "interference stripes" utilizing interference of light.

Here, a first imaginary straight line connecting the light irradiation portion 3 that applies the pattern light P1 and the center of the identification region R1 is inclined at a predetermined angle θ1 with respect to a second imaginary straight line extending along the conveying direction D1 of the sheet Sh1. In the present embodiment, in the identification region R1, the surface A1 of the sheet Sh1 is along the conveying direction D1 of the sheet Sh1, so that the angle between the first imaginary straight line and the surface A1 of the sheet Sh1 is the predetermined angle θ1. Further, since the first imaginary straight line is the optical axis Ax1 of the pattern light P1, the optical axis Ax1 of the pattern light P1 is inclined at the predetermined angle θ1 with respect to the surface A1 of the sheet Sh1. In particular, in the present embodiment, the light irradiation portion 3 is configured to irradiate the identification region R1 with the pattern light P1 obliquely at the predetermined angle θ1 from the downstream side in the conveying direction D1, that is, the front side in the conveying direction of the sheet Sh1. Thus, deformation, distortion, or the like according to the asperities on the surface A1 is likely to appear in the pattern on the identification region R1.

The imaging portion 4 captures an image of the identification region R1 of the surface A1 of the sheet Sh1 as the identification image Im1. Since the image captured by the imaging portion 4 is an image (identification image Im1) of the identification region R1 on which the pattern light P1 is being projected, the light irradiation portion 3 irradiates the identification region R1 with the pattern light P1 at least at the imaging timing of the imaging portion 4. In the present embodiment, as an example, the imaging portion 4 and the light irradiation portion 3 are synchronized with each other, and the light irradiation portion 3 applies the pattern light P1 in accordance with the imaging timing of the imaging portion 4. In other words, the light irradiation portion 3 does not output the pattern light P1 during the period in which the imaging portion 4 does not perform imaging, thereby suppressing unnecessary power consumption in the light irradiation portion 3.

In the present embodiment, as shown in FIG. 3, the imaging portion 4 includes an imaging element 41 and an optical component 42. The imaging element 41 includes an area sensor or a line sensor, and outputs image data of the captured identification image Im1 to the control portion 16 as an electric signal. In the present embodiment, as an example, the imaging portion 4 is an area sensor of a contact image sensor (CIS) system using a complementary metal oxide semiconductor (CMOS) sensor as the imaging element 41. However, the imaging portion 4 is not limited to this example, and may be a sensor of a CCD system using a charge coupled device (CCD) as the imaging element 41, for example.

The optical component 42 includes, for example, an imaging lens, and is disposed between the imaging element 41 and the identification region R1 of the surface A1 of the sheet Sh1. Thus, the light of the identification region R1 enters the imaging element 41 through the optical component 42. In the present embodiment, the imaging element 41 and the optical component 42 are arranged on a perpendicular line of the identification region R1 passing through the center (center of gravity) of the identification region R1. Further, a light receiving surface 411 (see FIG. 3) of the imaging element 41 is arranged parallel to the identification region R1. Therefore, the optical axis Ax2 (see FIG. 3) of the imaging portion 4 is a perpendicular line of the light receiving surface 411 passing through the center (center of gravity) of the light receiving surface 411 of the imaging element 41. The optical axis Ax2 of the imaging portion 4 is also orthogonal to the identification region R1, and intersects the optical axis Ax1 of the light irradiation portion 3 (pattern light P1) at the center of the identification region R1. The area of the identification region R1 captured by the imaging element 41 is equal to a numerical value obtained by dividing the area of the light receiving surface 411 of the imaging element 41 by the image magnification M of the optical component 42. In the present embodiment, the image magnification M is assumed to be "1" for simplicity of explanation. However, the image magnification M may be a value other than 1.

In the present embodiment, as an example, the imaging portion 4 is integrated with the light irradiation portion 3 to form a sensor unit 20 (see FIG. 2). In other words, the sensor unit 20 includes the light irradiation portion 3 and the imaging portion 4. The sensor unit 20 is housed in the housing 100 of the image processing apparatus 10, and is electrically connected to at least the control portion 16.

In the present embodiment, as shown in FIG. 2, the sensor unit 20 including the light irradiation portion 3 and the imaging portion 4 is arranged to face the conveying path T1 between the sheet feed portion 14 and the image forming portion 13. Therefore, the imaging position of the identification region R1 is set on the conveying path T1 between the sheet feed portion 14 and the image forming portion 13. That is, the light irradiation portion 3 and the imaging portion 4 can capture the identification image Im1 by irradiating the sheet Sh1 conveyed from the sheet feed portion 14 to the image forming portion 13 with the pattern light P1 at a position between the sheet feed portion 14 and the image forming portion 13. More specifically, the sensor unit 20 is disposed at a position upstream of the transfer device 131 of the image forming portion 13 and downstream of the merging point of the conveying path T1 connected to the plurality of sheet feed cassettes 141 in the conveying direction D1 of the sheet Sh1. Therefore, the identification image Im1 can be captured by one sensor unit 20 also for the sheets Sh1 supplied to the image forming portion 13 from the plurality of sheet feed cassettes 141, eliminating the need to provide a sensor unit 20 for each sheet feed cassette 141.

The surface A1 of the sheet Sh1 including the identification region R1 is a side where an image is formed by the image forming portion 13 in the thickness direction of the sheet Sh1, as an example in the present embodiment, but is not limited to this example. The identification region R1 may be set, for example, on a side (back side) where an image is not formed by the image forming portion 13 in the thickness direction of the sheet Sh1. In this case, the light irradiation portion 3 and the imaging portion 4 are disposed on the back side of the sheet Sh1. In addition, the identification region R1 may be set, for example, on both sides in the thickness direction of the sheet Sh1. In this case, two sets of the light irradiation portion 3 and the imaging portion 4 may be provided on both sides in the thickness direction of the sheet Sh1, or the sheet Sh1 may be turned over so that the identification images Im1 on both sides of the sheet Sh1 are captured by one set of the light irradiation portion 3 and the imaging portion 4.

The thickness sensor 5 detects a physical quantity relating to the thickness of the sheet Sh1. The thickness sensor 5 outputs the detected physical quantity as an electric signal to the control portion 16. Thus, the control portion 16 can identify the thickness of the sheet Sh1. As an example, the thickness sensor 5 includes an optical sensor that detects the thickness (or basis weight) of the sheet Sh1 using transmitted light. The thickness sensor 5 may be included in the sensor unit 20 or provided separately from the sensor unit 20.

The acquisition portion 21 acquires the identification image Im1 captured by the imaging portion 4. Specifically, the acquisition portion 21 acquires the image data of the identification image Im1 captured by the imaging portion 4 as an electric signal from the imaging element 41 of the imaging portion 4. The acquisition portion 21 controls the light irradiation portion 3 and the imaging portion 4 to cause the light irradiation portion 3 to apply the pattern light P1 and the imaging portion 4 to capture the identification image Im1 in accordance with, for example, the timing when the sheet Sh1 passes a position on the conveying path T1 corresponding to the sensor unit 20. The identification image Im1 acquired by the acquisition portion 21 is temporarily stored in the one or more memories. The acquisition portion 21 may acquire the identification image Im1 from a source other than the imaging portion 4.

The asperity identification portion 22 identifies asperity information on the asperities on the surface A1 of the sheet Sh1 based on the identification image Im1 acquired by the acquisition portion 21. Thus, the state of the asperities on the surface A1 of the sheet Sh1 can be identified. The asperity information includes information on at least one of the dimension of the asperities on the surface A1 in the direction orthogonal to the plane along the surface A1 and the dimension in the direction along the plane. That is, the asperity information includes information on the height (or depth) of the asperities, which is the dimension in the direction orthogonal to the plane along the surface A1 and/or the size of the asperities in plan view, which is the dimension in the direction along the plane. Thus, the height (or depth) of the asperities of the surface A1 of the sheet Sh1 and/or the size of the asperities in plan view can be identified. In the present embodiment, as an example, the asperity identification portion 22 calculates a numerical value corresponding to the arithmetic average height (Sa) of the surface A1 relating to the heights (or depths) of the asperities as the asperity information.

Here, the asperity identification portion 22 identifies the asperity information based on the degree of deformation, distortion, or the like of the pattern light P1 in the identification image Im1. That is, since the identification image Im1 includes a luminance distribution of a pattern (stripe pattern in the present embodiment) corresponding to the pattern light P1, which is produced in the identification region R1 by the projection of the pattern light P1, the pattern is deformed or distorted by the asperities on the surface A1. For example, even when the pattern light P1 forms a linear pattern, the pattern light P1 projected on the surface A1 is deformed (meandered) in accordance with the asperities on the surface A1. Therefore, the asperity identification portion 22 calculates asperity information on the asperities on the surface A1 from the degree of deformation, distortion, or the like of the pattern light P1. In the present embodiment, the asperity identification portion 22 identifies the asperity information based at least on the variation in the line width of the pattern light P1 on the identification region R1. Thus, the state of the asperities on the surface A1 of the sheet Sh1 can be identified by relatively simple arithmetic processing.

The condition determination portion 23 determines image processing conditions based on the asperity information identified by the asperity identification portion 22. The image processing conditions here are conditions relating to image formation or image reading. That is, various image processing conditions including an image forming condition relating to image formation and/or an image reading condition relating to image reading executed in the image processing apparatus 10 are determined by the condition determination portion 23. Specifically, the image processing conditions include, for example, the fixing pressure, the fixing temperature, the conveying speed of the sheet Sh1, the transfer voltage, or the like in the image forming portion 13, as well as the sheet conveying speed, the light intensity, the resolution, or the like in the image reading portion 12. For example, when the arithmetic average height (Sa) of the surface A1 of the sheet Sh1 is larger (i.e., rougher), heat may be more difficult to be transferred at the time of fixing by the image forming portion 13, or the electrical contact resistance may be higher at the time of transferring, so that the current may be more difficult to flow. Therefore, the condition determination portion 23 automatically sets the image processing conditions based on the asperity information so as to increase the fixing temperature, decrease the conveying speed, or increase the transfer voltage when the arithmetic average height (Sa) becomes larger (i.e., rougher). This enables image formation and/or image reading under appropriate image processing conditions according to the asperities on the surface A1 of the sheet Sh1, leading to an improvement in the quality (including image quality) of image formation and/or image reading.

In addition, in the present embodiment, the condition determination portion 23 determines image processing conditions relating to image formation or image reading based on the fiber direction. That is, in the present embodiment, the fiber direction of the surface A1 of the sheet Sh1 is identified by the direction identification portion 24. Therefore, the condition determination portion 23 determines the image processing conditions based on not only the asperity information but also the fiber direction. For example, in the inkjet type image forming portion 13, the curl behavior differs depending on the fiber direction, so that the curl direction may be predicted in accordance with the fiber direction for curl correction. The image processing conditions determined by the condition determination portion 23 based on the fiber direction include a condition for curl correction. In addition, the "skew" in which the long side or the short side of the sheet Sh1 is tilted with respect to the conveying direction can also be estimated from the fiber direction; therefore, the image processing conditions determined by the condition determination portion 23 based on the fiber direction may include a condition for skew correction. This enables image formation and/or image reading under appropriate image processing conditions according to the fiber direction on the surface A1 of the sheet Sh1, leading to an improvement in the quality (including image quality) of image formation and/or image reading.

However, the condition determination portion 23 only has to have a function of determining the image processing conditions based on at least one of the asperity information and the fiber direction. That is, the condition determination portion 23 is not necessarily be configured to determine the image processing conditions based on both the asperity information and the fiber direction, and may determine the image processing conditions based on only one of the asperity information and the fiber direction. Further, in the present embodiment, the thickness identification portion 25 identifies the thickness of the sheet Sh1. Therefore, the condition determination portion 23 may determine the image processing conditions based on the thickness of the sheet Sh1 in addition to or instead of at least one of the asperity information and the fiber direction.

The direction identification portion 24 identifies the fiber direction of the surface A1 of the sheet Sh1 based on the identification image Im1. Here, the direction identification portion 24 identifies the fiber direction based on the deformation, distortion, or the like of the pattern light P1 in the identification image Im1. That is, depending on the line width of the pattern light P1 on the identification region R1, the degree of deformation, distortion, or the like of the pattern light P1 caused by the asperities on the surface A1 varies in accordance with the relationship between the extending direction of the pattern light P1 and the fiber direction. Therefore, in the present embodiment, the direction identification portion 24 identifies the fiber direction based at least on the variation in the line width of the pattern light P1 on the identification region R1. Thus, the fiber direction of the surface A1 of the sheet Sh1 can be identified by relatively simple arithmetic processing.

The thickness identification portion 25 identifies the thickness of the sheet Sh1 based on the output of the thickness sensor 5. That is, the thickness identification portion 25 receives an electric signal representing a physical quantity relating to the thickness of the sheet Sh1 from the thickness sensor 5, and calculates the thickness of the sheet Sh1. Since the sheet identification device 2 according to the present embodiment includes the thickness identification portion 25, it can estimate the type (paper type) of the sheet Sh1 based on not only the state of the surface A1 of the sheet Sh1 but also the thickness thereof.

[4] Sheet Identification Method

Next, a sheet identification method according to the present embodiment, i.e., the operation of the sheet identification device 2 will be described with reference to FIG. 5 to FIG. 7.

[4.1] Principle

First, the principle of the asperity identification portion 22 identifying the asperity information based on the identification image Im1 will be described with reference to FIG. 5 and FIG. 6. In FIG. 5, the bright portions L1 of the pattern light P1 are schematically indicated by dotted lines, and the dark portions L2 are schematically indicated by dash-dot-dot-dash lines.

As shown as "CONVEX PORTION 1" in the upper part of FIG. 5, it is assumed that there is a rectangular parallelepiped convex portion A11 having a height ΔZ from the surface A1 on the surface A1 of the sheet Sh1. Here, the pattern light P1 is obliquely incident on the surface A1 of the sheet Sh1 at the predetermined angle θ1. Therefore, the pattern light P1 is projected on the same plane as the surface A1 except at the convex portion A11, and projected frontward by the height ΔZ at the convex portion A11 than on the surface A1, so that the projection position of the pattern light P1 is shifted only at the convex portion A11 when viewed from the perpendicular direction of the surface A1. That is, the pattern light P1 (the bright portions L1 and the dark portions L2) of a portion provided with the convex portion A11 in the identification image Im1 captured by the imaging portion 4 is shifted from the original projection position on the surface A1 by the shift amount ΔX represented by the following Equation 1:

$$\Delta X = \Delta Z / \tan \theta 1 \quad \text{(Equation 1)}$$

Since the predetermined angle θ1 is known, when the shift amount ΔX is obtained from the identification image Im1, the height ΔZ of the convex portion A11 can be calculated from the shift amount ΔX and the Equation 1. Then, the asperity information of the entire identification region R1 can be obtained from the shift amounts ΔX of the entire identification region R1. The asperity information calculated in this way has a correlation with the arithmetic average height (Sa) of the surface A1.

In addition, as shown as "CONVEX PORTION 2" in the lower part of FIG. 5, even when where is a triangular prism-shaped convex portion A12 whose height ΔZ from the surface A1 varies from part to part on the surface A1 of the sheet Sh1, the heights ΔZ of the respective parts of the convex portion A12 can be calculated. That is, similarly to the above example, by obtaining the shift amounts ΔX from the identification image Im1, the heights ΔZ of the convex portion A12 can be calculated from the above Equation 1. Therefore, for example, as in the case of the paper sheet Sh1, the asperity information can also be calculated for the asperities caused by the undulation component generated by continuous entanglement of many fibers.

By the way, in the method for obtaining the roughness of the surface A1 from the shadow image caused by the asperities as in the above-described related technique, for example, in the case of the paper sheet Sh1, the local fiber asperities are strongly reflected in the calculation result, so that the calculation result does not necessarily have a linear relationship with the arithmetic average height (Sa). Therefore, in the above-described method of the related technique, it is difficult to determine from the calculation result the magnitude of the surface roughness of the sheet Sh1 of the same type (for example, plain paper), although it may be possible to discriminate between glossy paper with a high flatness (gloss paper) and plain paper, for example. Therefore, in the above-described method of the related technique, in order to determine the magnitude of the surface roughness, it is necessary to prepare in advance, for example, a table (database) in which the calculation results of various sheets Sh1 are associated with arithmetic average heights (Sa).

In contrast, in the sheet identification device 2 according to the present embodiment, by optimizing the line width, the predetermined angle θ1, and the like of the pattern light P1, the asperity information having a high linearity with the arithmetic average height (Sa) can be calculated while also reducing the influence of local fibers. Therefore, according to the method of the present embodiment, it is possible to uniquely obtain an arithmetic average height (Sa) from the calculation result of the asperity identification portion 22 without preparing in advance the table (database) in which the calculation results (asperity information) are associated with arithmetic average heights (Sa).

FIG. 6 shows an example of the identification image Im1 obtained by the sheet identification device 2 according to the present embodiment. Here, as the imaging conditions of the identification image Im1, lit is assumed that the predetermined angle θ1 is 40 degrees, the resolution (number of pixels) of the imaging element 41 is 100×100, the line width W1 (see FIG. 4) of the bright portion L1 of the stripe pattern produced by the pattern light P1 is 120 μm, and the line width W2 (see FIG. 4) of the dark portion L2 is 120 μm. Further, it is assumed that the image magnification M is "1", and the irradiation direction of the pattern light P1, that is, the arrangement direction of the bright portions L1 and the dark portions L2 is the same as the fiber direction.

The identification image Im1 is composed of a plurality of pixels, and each of the plurality of pixels has a pixel value corresponding to luminance. In the present embodiment, as an example, the relationship between the luminance and the pixel value is defined such that the higher the luminance, the larger the pixel value. Therefore, in the identification image Im1 obtained by capturing the identification region R1 on which the pattern light P1 is projected, the pixel values of the pixels corresponding to the bright portion L1 are relatively large values, and the pixel values of the pixels corresponding to the dark portion L2 are relatively small values.

The upper part ("Sa: SMALL") of FIG. 6 shows a identification image Im1 when the pattern light P1 is projected on an identification region R1 of glossy paper (gloss paper) having a small arithmetic average height (Sa), that is, having a high flatness. On the other hand, the lower part ("Sa: LARGE") of FIG. 6 shows an identification image Im1 when the pattern light P1 is projected on an identification region R1 of plain paper (Sa=6 μm) having a large arithmetic average height (Sa), that is, having a low flatness. As shown in FIG. 6, as the arithmetic average height (Sa) increases, the deformation and distortion of the stripe pattern produced by the pattern light P1 in the identification image Im1 increase. Specifically, when the deformation and distortion of the stripe pattern increase, the boundary line between the bright portion L1 and the dark portion L2 of the stripe pattern is distorted, and the variation in the line width of each of the bright portion L1 and the dark portion L2 increases. That is, as the arithmetic average height (Sa) increases, the undulation component of the height of the surface A1 increases, so that the variation in the line width of each of the bright portion L1 and the dark portion L2 increases. As described above, in FIG. 6, it is apparent that, deformation, distortion, or the like occurs in the stripe pattern produced by the pattern light P1 in the identification image Im1, in accordance with the asperities on the surface A1.

[4.2] Specific Processing

Next, specific processing for identifying the asperity information based on the identification image Im1 by the asperity identification portion 22 will be described with reference to FIG. 7. Steps S1, S2, . . . in the flowchart shown in FIG. 7 represent the numbers of the processing procedure (steps) executed by the control portion 16. The processing to be described below is started in accordance with the timing at which the sheet Sh1 passes the position (monitor position) corresponding to the sensor unit 20 of the conveying path T1, for example.

When the purpose is to restore a three-dimensional shape, the analysis of the identification image Im1 including the pattern light P1 can be realized by, for example, a method of continuously projecting a plurality of pattern lights P1 and using a Fourier transform or the like of the identification images Im1 to calculate a phase change of the pattern light P1. However, this method has a relatively high calculation load, takes a relatively long time to calculate the roughness (asperity information) of the surface A1, and also requires relatively high hardware (CPU, GPU, memory, etc.) costs. Therefore, in the present embodiment, instead of the above-described method, the following method is adopted so that the roughness (asperity information) of the surface A1 can be calculated by relatively simple arithmetic processing.

That is, in the present embodiment, the asperity identification portion 22 calculates the width (line width) of at least one of the bright portions L1 and the dark portions L2 for each row (each line) of the identification image Im1, with the arrangement direction (left-right direction in FIG. 6) of the bright portions L1 and the dark portions L2 in the identification image Im1 as a "row direction". That is, the identification image Im1 is an "N pixels×M rows" image in which N pixels are arranged in the arrangement direction of the bright portions L1 and the dark portions L2, and the asperity identification portion 22 calculates the line width of each row of the M rows included in the identification image Im1. The asperity identification portion 22 obtains the line width of at least one of the bright portion L1 and the dark portion L2 calculated for each row as described above for the entire identification image Im1, and calculates the magnitude of the variation in the line width in the identification image Im1 as the asperity information. Thus, the asperity identification portion 22 can obtain asperity information having a correlation with the arithmetic average height (Sa) of the surface A1, based on the variation in the line width of the pattern light P1.

<Step S1>

Specifically, in step S1, the control portion 16 determines whether the sheet Sh1 has reached the monitor position, that is, the position corresponding to the sensor unit 20 on the conveying path T1. When the sheet feed portion 14 supplies the sheet Sh1 to the image forming portion 13, the control portion 16 determines that the sheet Sh1 has reached the monitor position when the sheet Sh1 is detected by a sensor at the monitor position (S1: Yes), and shifts the processing to step S2. On the other hand, if the sheet Sh1 is not detected by the sensor at the monitor position, the control portion 16 determines that the sheet Sh1 has not reached the monitor position (S1: No), and shifts the processing to step S1.

<Steps S2 and S3>

In step S2, the control portion 16 controls, at the acquisition portion 21, the light irradiation portion 3 to cause the light irradiation portion 3 to apply the pattern light P1. Thus, the pattern light P1 is projected on the identification region R1 of the surface A1 of the sheet Sh1. In step S3, the control portion 16 controls, at the acquisition portion 21, the imaging portion 4 to cause the imaging portion 4 to image the identification region R1 on which the pattern light P1 is being projected. Thus, an identification image Im1, which is an image of the identification region R1 of the surface A1 of the sheet Sh1, is generated by the imaging portion 4.

<Step S4>

In step S4, the control portion 16 acquires, at the acquisition portion 21, an image of one row (one line) of the identification image Im1 from the imaging portion 4. That is, the acquisition portion 21 acquires one row of the identification image Im1 corresponding to one pixel in the column direction. Since the imaging portion 4 (imaging element 41) is generally designed to sequentially read out an image for each row, the amount of memory used can be kept low by acquiring and analyzing (steps S5 and S6) the identification image Im1 for each row in this manner.

<Step S5>

In step S5, the control portion 16 executes, at the acquisition portion 21, preprocessing on the identification image Im1. At this time, one row (one line) of the identification image Im1 acquired in step S4 is subjected to the preprocessing. That is, the control portion 16 executes the preprocessing on the identification image Im1 row by row. The preprocessing includes, for example, filtering processing and binarization processing. Specifically, the control portion 16 performs noise removal or the like in the filtering processing and further performs binarization with a reference value for one row of the identification image Im1.

The reference value used in the binarization processing is, for example, an average value of a plurality of pixels, a value determined in advance (predetermined value), or the like. The pixels corresponding to the bright portions L1 become "white pixels" as pixels having pixel values equal to or greater than the reference value, and the pixels corresponding to the dark portions L2 become "black pixels" as pixels having pixel values less than the reference value. The preprocessing may include trimming processing for cutting out only a part of the identification image Im1 to narrow down the area to be processed in step S6. In addition, the filtering processing and the like are not essential, and may be omitted as appropriate.

<Step S6>

In step S6, the control portion 16 extracts, at the asperity identification portion 22, width data indicating the width (line width) of at least one of the bright portion L1 and the dark portion L2 from the identification image Im1. At this time, the width data is extracted from one row (one line) of the identification image Im1 acquired in step S4. That is, the control portion 16 executes extraction of width data on the identification image Im1 row by row. Specifically, the control portion 16 calculates, as the width data, the number of white pixels corresponding to the bright portions L1 and the number of black pixels corresponding to the dark portions L2 in one row of the identification image Im1. At this time, the control portion 16 extracts the number of white pixels and the number of black pixels throughout one row of the identification image Im1, thereby extracting the sum of the line widths of the plurality of bright portions L1 and the sum of the line widths of the plurality of dark portions L2.

In the present embodiment, as an example, both the number of white pixels corresponding to the line widths of the bright portions L1 and the number of black pixels corresponding to the line widths of the dark portions L2 are used as the width data, but the present disclosure is not limited to this example, and only the number of pixels of either the bright portions L1 or the dark portions L2 may be used as the width data. That is, the control portion 16 may identify the asperity information by focusing on the line widths of either the bright portions L1 or the dark portions L2. In addition, the control portion 16 may extract the line width of each bright portion L1 and that of each dark portion L2 by extracting the number of white pixels consecutive in the row direction and the number of black pixels consecutive in the row direction. In this case, the control portion 16 may use the line width of each of the plurality of bright portions L1 (or dark portions L2) as the width data, or may use a representative value (for example, an average value, a mode value, a median value, or the like) of the line widths of the plurality of bright portions L1 (or dark portions L2) as the width data.

<Step S7>

In step S7, the control portion 16 determines whether or not processing has been completed to the last one row of the identification image Im1. That is, with respect to the "N pixels×M rows" identification image Im1, if the processing target is the M-th row which is the last row, the control portion 16 determines that the processing has been completed to the last row (S7: Yes), and shifts the processing to step S8. On the other hand, if the processing target is not the M-th row which is the last row, the control portion 16 determines that the processing has not been completed to the last row (S7: No), and shifts the processing to step S4 to acquire the next one row of the identification image Im1.

<Step S8>

In step S8, the control portion 16 calculates, at the asperity identification portion 22, the standard deviation σ of the width data of the M rows of the identification image Im1. As the arithmetic average height (Sa) increases, the undulation component of the height of the surface A1 increases, so that the variation in the line width of each of the bright portion L1 and the dark portion L2 increases (see FIG. 6), and the standard deviation σ increases. That is, the asperity identification portion 22 calculates the standard deviation σ as the asperity information.

<Step S9>

In step S9, the control portion 16 determines, at the condition determination portion 23, image processing conditions. That is, the condition determination portion 23 determines the image processing conditions including image forming conditions in accordance with the standard deviation σ calculated in step S8. As an example, when the standard deviation σ increases, the condition determination portion 23 sets the image forming conditions so as to increase the fixing temperature, decrease the conveying speed, or increase the transfer voltage. Thus, when an image is formed on the sheet Sh1 by the image forming portion 13, the image forming conditions corresponding to the asperities on the surface A1 of the sheet Sh1 are automatically applied.

Figure 7:
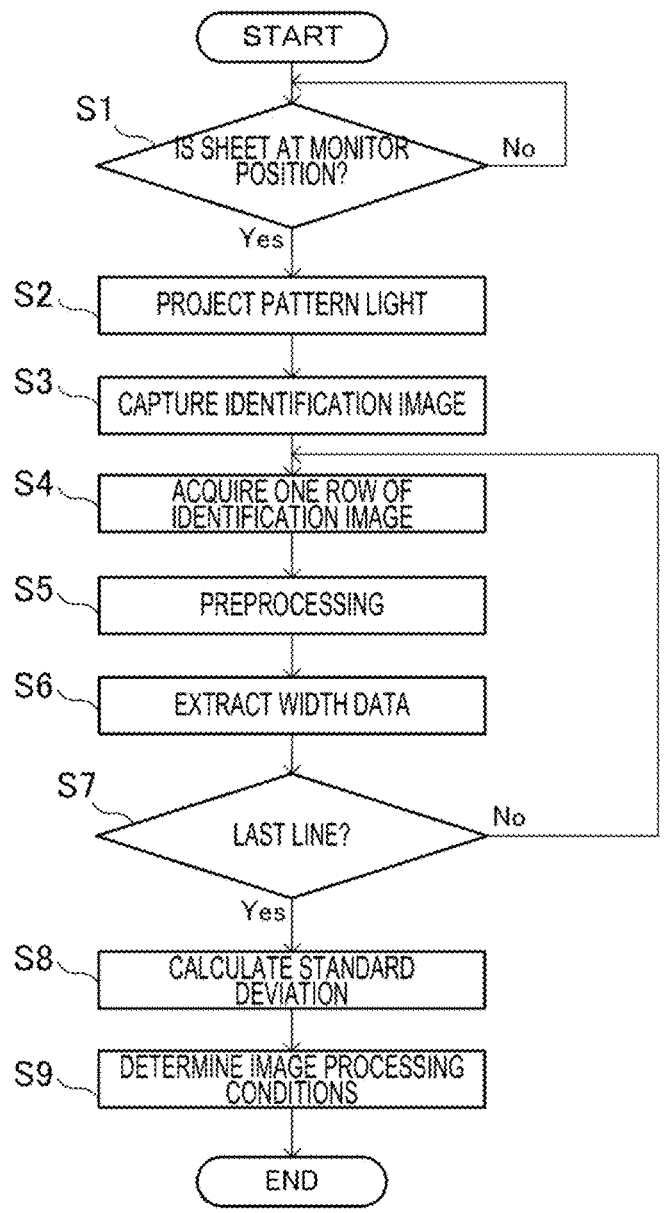
FIG. 7 is a flowchart of an example operation of the sheet identification device according to the first embodiment.

The procedure of the sheet identification method described above is merely an example, and the order of the processes shown in the flowchart of FIG. 7 may be changed as appropriate.

[5] Irradiation Angle

Next, the irradiation angle of the pattern light P1 will be described with reference to FIG. 8, which shows examples of the identification image Im1 when the predetermined angle θ1 is changed. In FIG. 8, as the imaging conditions of the identification image Im1, it is assumed that the arithmetic average height (Sa) of the identification region R1 is 6 μm, the resolution (number of pixels) of the imaging element 41 is 100×100, the line width W1 of the bright portion L1 of the stripe pattern produced by the pattern light P1 is 100 μm, and the line width W2 of the dark portion L2 is 100 μm. Further, it is assumed that the irradiation direction of the pattern light P1, that is, the arrangement direction of the bright portion L1 and the dark portion L2 is the same as the fiber direction.

The optical axis Ax1 of the pattern light P1 is inclined at the predetermined angle θ1 with respect to the surface A1 of the sheet Sh1 (see FIG. 3). Here, the predetermined angle θ1 has a great influence on the brightness of the identification image Im1. In the method for obtaining the roughness of the surface A1 from the shadow image caused by the asperities as in the related technique described above, the irradiation angle (corresponding to the predetermined angle θ1) of the light with respect to the surface A1 of the sheet Sh1 is set relatively shallow (small) in order to capture the asperities on the order of several micrometers as a shadow image. In particular, in order to increase the sensitivity to asperities, the irradiation angle is set at a very shallow angle of about 10 degrees. However, at very small irradiation angles, sufficient light does not reach the imaging portion 4, and the identification image Im1 becomes a relatively dark image, so that a relatively expensive high-sensitivity imaging element 41 is required to obtain the roughness of the surface A1 from the dark image.

In contrast, in the sheet identification device 2 according to the present embodiment, the roughness of the surface A1 is obtained from the degree of deformation, distortion, or the like of the pattern light P1 in the identification image Im1; therefore, it is sufficient that deformation, distortion, or the like of the pattern light P1 is caused by asperities. Therefore, in the present embodiment, the predetermined angle θ1 can be set larger than in the method of the related technique described above, and a bright image can be realized as the identification image Im1. Therefore, the roughness of the surface A1 can be obtained from the identification image Im1 even with a relatively inexpensive imaging element 41.

Rather, in the configuration of the present embodiment, as shown in FIG. 8, when the predetermined angle θ1 becomes small, the shape of the pattern light P1 projected on the identification region R1 collapses, and the boundary between the bright portion L1 and the dark portion L2 of the stripe pattern becomes ambiguous. That is, as is clear from FIG. 8, the shape of the pattern light P1 collapses more when the predetermined angle θ1 is 30 degrees than when it is 40 degrees, when the predetermined angle θ1 becomes 20 degrees, the shape of the pattern light P1 collapses further, and when the predetermined angle θ1 becomes 10 degrees, the shape of the pattern light P1 collapses even further. From the identification image Im1 of the pattern light P1 whose shape has been collapsed as described above, it is difficult to extract deformation, distortion, or the like of the pattern light P1 caused by asperities. The inventors have verified various predetermined angles θ1, and have found that the predetermined angle θ1 is preferably 20 degrees or more when the sheet Sh1 having an arithmetic average height (Sa) of the surface A1 of about several micrometers is the target.

In short, in consideration of the brightness of the identification image Im1, the predetermined angle θ1 is preferably 10 degrees or more, and more preferably 15 degrees or more. Further, in the present embodiment, the predetermined angle θ1 is set at 20 degrees or more so that the shape of the pattern light P1 is not too deformed. That is, the predetermined angle θ1 is 20 degrees or more and 90 degrees or less. Here, the lower limit value of the predetermined angle θ1 is not limited to 20 degrees, and may be, for example, 25 degrees, 30 degrees, 35 degrees, 40 degrees, 45 degrees, 50 degrees, 55 degrees, 60 degrees, 65 degrees, 70 degrees, 75 degrees, or 80 degrees. Also, the upper limit value of the predetermined angle θ1 is not limited to 90 degrees, and may be, for example, 85 degrees, 80 degrees, 75 degrees, 70 degrees, 65 degrees, 60 degrees, 55 degrees, 50 degrees, or 45 degrees.

Since the difference between 90 degrees and the predetermined angle θ1 corresponds to the "incident angle" which is the angle between the pattern light P1 and the perpendicular line of the surface A1, the "incident angle" of the pattern light P1 when the predetermined angle θ1 is 20 degrees is 70 degrees (=90 degrees−20 degrees). On the other hand, when the predetermined angle is 90 degrees, the incident angle of the pattern light P1 is 0 degrees.

[6] Line Width

Figure 9:
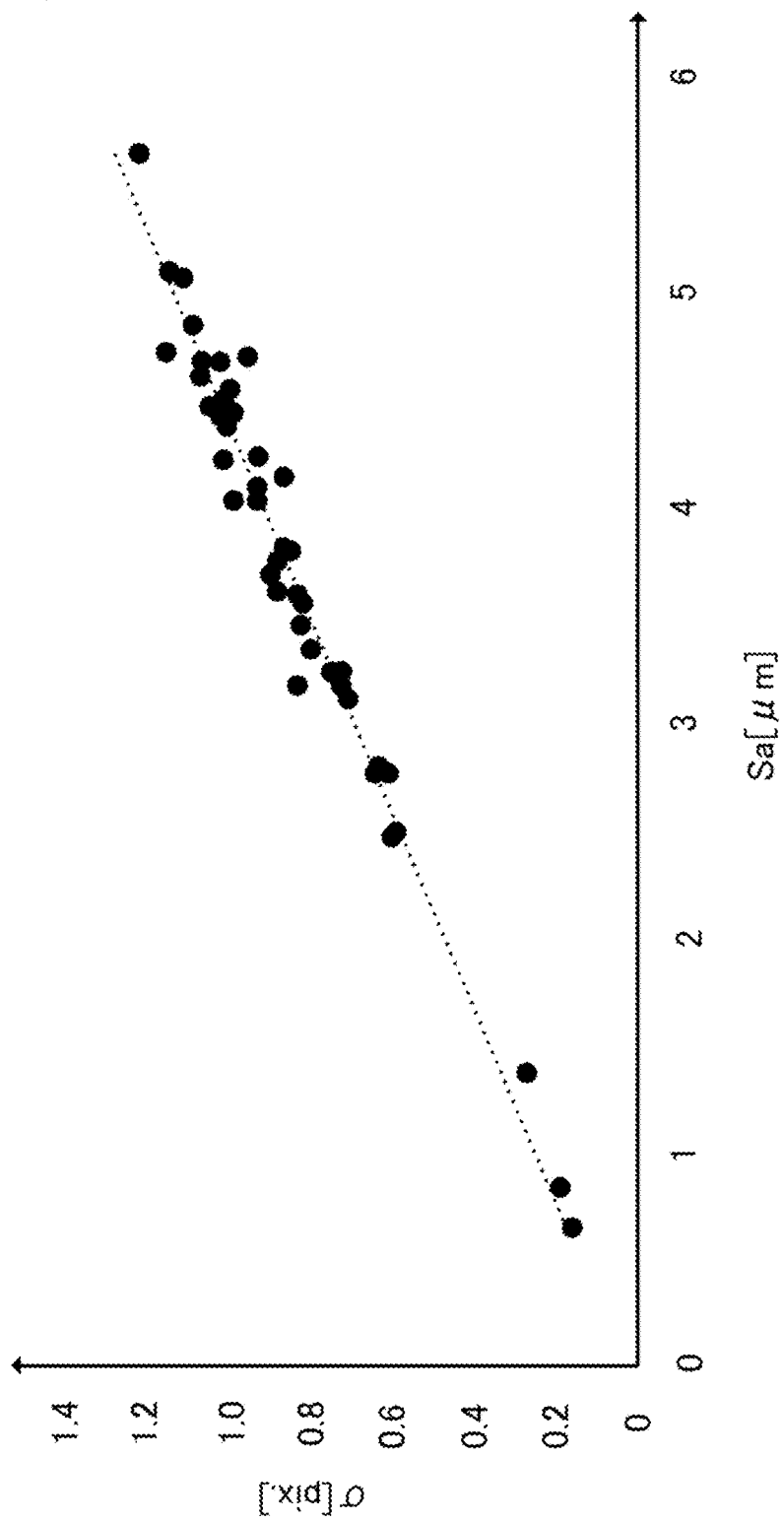
FIG. 9 is a graph showing the relationship between the arithmetic average height and the standard deviation obtained in the sheet identification device according to the first embodiment.

Next, the line width of the pattern light P1 will be described later with reference to FIG. 9 and FIG. 10. FIG. 9 is a graph showing the relationship between the standard deviation a as the asperity information calculated in accordance with the flowchart of FIG. 7 and the actual arithmetic average height Sa for 48 types of sheets Sh1. In FIG. 9, the horizontal axis represents the arithmetic average height Sa, and the vertical axis represents the standard deviation a (the standard deviation a is an average value of five locations in the bright portion L1 or the dark portion L2). In FIG. 9, as the imaging conditions of the identification image Im1, it is assumed that the resolution (number of pixels) of the imaging element 41 is 100×100, the line width W1 of the bright portion L1 of the stripe pattern produced by the pattern light P1 is 80 μm, and the line width W2 of the dark portion L2 is 80 μm. Further, it is assumed that the irradiation direction of the pattern light P1, that is, the arrangement direction of the bright portion L1 and the dark portion L2 is the same as the fiber direction.

In the example of FIG. 9, the determination coefficient $R^2$ of the linear regression model of the arithmetic average height Sa and the standard deviation a is "0.9684", which confirms a high linearity between the standard deviation a as the asperity information and the arithmetic average height Sa.

On the other hand, FIG. 10 shows the results of calculating the determination coefficient $R^2$ while changing the line width of the pattern light P1 and the relationship between the irradiation direction of the pattern light P1 and the fiber direction. In FIG. 10, as the imaging conditions of the identification image Im1, it is assumed that the predetermined angle θ1 is 40 degrees and the resolution (number of pixels) of the imaging element 41 is 100×100. Under the conditions, the line width W1 of the bright portion L1 and the line width W2 of the dark portion L2 of the stripe pattern produced by the pattern light P1 are changed in the range of 40 μm to 200 μm, and the relationship between the irradiation direction of the pattern light P1 and the fiber direction is changed between "the same" (that is, parallel) and "90°" (that is, orthogonal).

According to FIG. 10, it is presumed that the influence of the relationship between the irradiation direction of the pattern light P1 and the fiber direction on the standard deviation a as the asperity information varies depending on the line width of the pattern light P1. That is, in FIG. 10, it can be confirmed that the smaller (thinner) the line width of the pattern light P1, the greater the influence of the relationship between the irradiation direction of the pattern light P1 and the fiber direction on the standard deviation a as the asperity information. It is considered that this is because the width of the fiber of the sheet Sh1 is several tens of micrometers or less, and the line width of the pattern light P1 approaches the fiber width, which makes the local undulation component of the height of the surface A1 likely to occur as the variation in the line width of each of the bright portion L1 and the dark portion L2.

When the line width of the pattern light P1 is 100 μm or more, the determination coefficient $R^2$ is "0.85" or more regardless of the relationship between the irradiation direction of the pattern light P1 and the fiber direction. Therefore, when the line width of the pattern light P1 is 100 μm or more, the influence of the relationship between the irradiation direction of the pattern light P1 and the fiber direction on the standard deviation a as the asperity information is relatively small, and the relationship between the irradiation direction of the pattern light P1 and the fiber direction is negligible. In short, whether the relationship between the irradiation direction of the pattern light P1 and the fiber direction affects the asperity information is determined depending on whether the line width W1 of the bright portion L1 and the line width W2 of the dark portion L2 of the stripe pattern produced by the pattern light P1 are 100 μm or more, or less than 100 μm. Namely, when the line width is 100 μm or more, the relationship between the irradiation direction and the fiber direction hardly affects the asperity information, so that the calculated asperity information can be regarded as "independent of the fiber direction". On the other hand, when the line width is less than 100 μm, the relationship between the irradiation direction and the fiber direction is likely to affect the asperity information, so that the calculated asperity information can be regarded as "dependent on the fiber direction".

As described above, even in the sheet identification device 2 according to the present embodiment, the relationship between the irradiation direction of the pattern light P1 and the fiber direction may affect the standard deviation a as the asperity information, depending on the line width of the pattern light P1. By making the line width of the pattern light P1 relatively larger than the width of the fiber of the sheet Sh1, the influence can be reduced, which causes a high linearity between the standard deviation a as the asperity information and the arithmetic average height Sa.

From the above, in the present embodiment, the width of at least one of the bright portion L1 and the dark portion L2 is preferably 60 μm or more and 500 μm or less. Furthermore, in order to make the asperity information less susceptible to the relationship between the irradiation direction of the pattern light P1 and the fiber direction, it is preferable that at least one of the line width W1 of the bright portion L1 and the line width W2 of the dark portion L2 of the stripe pattern produced by the pattern light P1 is 100 μm or more. Conversely, in order to make the asperity information more susceptible to the relationship between the irradiation direction of the pattern light P1 and the fiber direction, it is preferable that at least one of the line width W1 of the bright portion L1 and the line width W2 of the dark portion L2 of the stripe pattern produced by the pattern light P1 is less than 100 μm. Here, the lower limit value of the width of at least one of the bright portion L1 and the dark portion L2 is not limited to 60 μm, and may be, for example, 65 μm, 70 μm, 75 μm, 80 μm, 85 μm, 90 μm, or 95 μm. Also, the upper limit value of the width of at least one of the bright portion L1 and the dark portion L2 is not limited to 500 μm, and may be, for example, 450 μm, 400 μm, 350 μm, 300 μm, 250 μm, 200 μm, 180 μm, 160 μm, 140 μm, or 120 μm.

[7] Lattice Pattern

Figure 11:
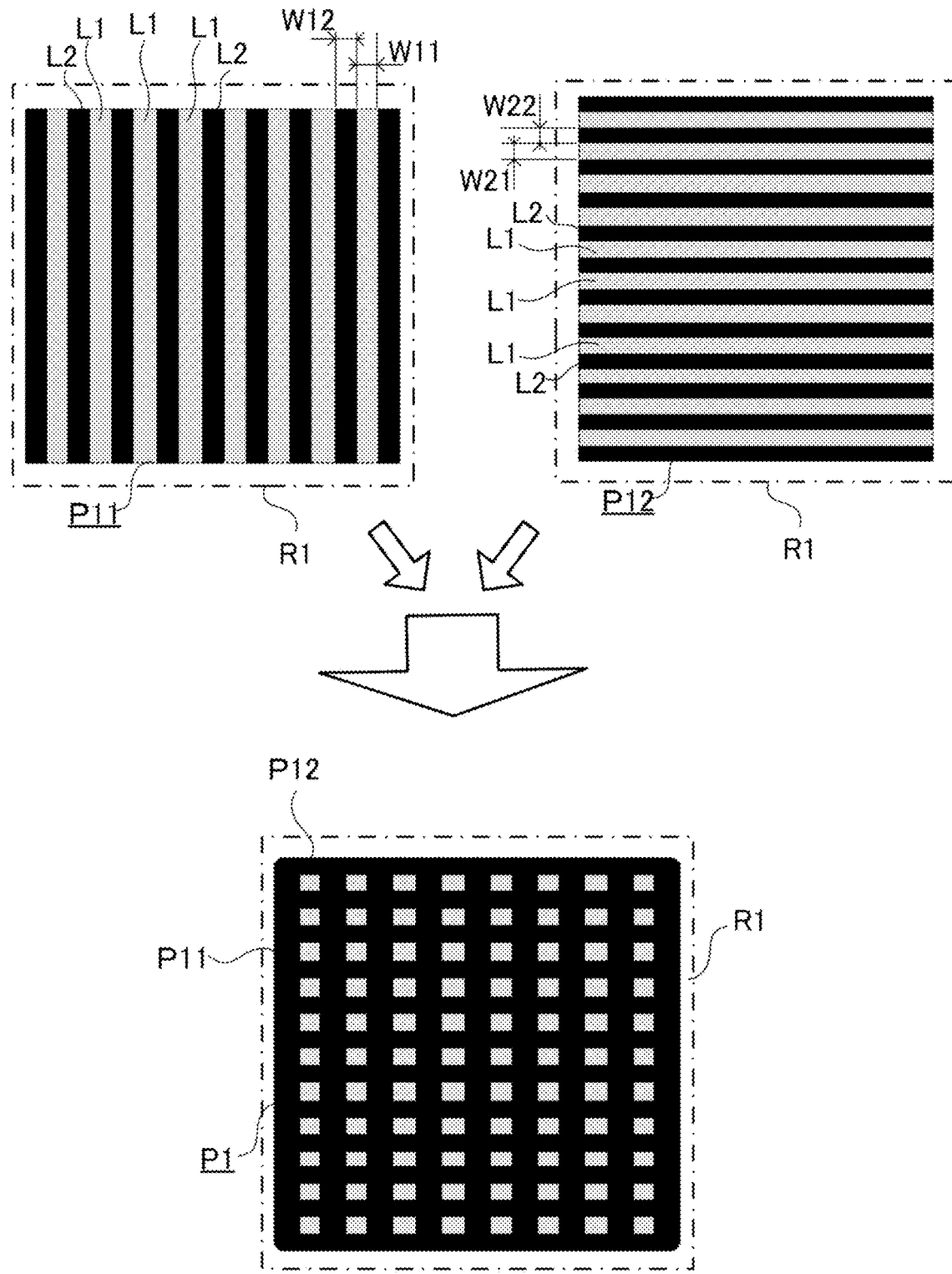
FIG. 11 is a schematic diagram showing pattern light which produces a lattice pattern in the sheet identification device according to the first embodiment.

Next, the pattern light P1 that produces a lattice pattern will be described with reference to FIG. 11. Namely, the projection of the pattern light P1 on the identification region R1 generates a luminance distribution of a lattice pattern including the bright portion L1 and the dark portion L2.

The lattice pattern is a superposition of a vertical stripe pattern and a horizontal stripe pattern, which are orthogonal to each other. Therefore, as shown in FIG. 11, the pattern light P1 that produces the lattice pattern can be regarded as combined light of first pattern light P11 that produces a first stripe pattern (vertical stripe pattern) and second pattern light P12 that produces a second stripe pattern (horizontal stripe pattern). In the example of FIG. 11, the dark portion L2 is prioritized in portions where the bright portion L1 and the dark portion L2 of the first pattern light P11 and the second pattern light P12 overlap, but the present disclosure is not limited to this, and the bright portion L1 may be prioritized. That is, the bright portion L1 (shaded) and the dark portion L2 (blackened) of the lattice pattern shown in FIG. 11 may be reversed.

Here, the line width of the first pattern light P11 and the line width of the second pattern light P12 are different from each other. That is, the vertical stripe and the horizontal stripe of the lattice pattern have different line widths. In the example of FIG. 11, the line width W11 of the bright portion L1 and the line width W12 of the dark portion L2 of the first pattern light P11 are larger than the line width W21 of the bright portion L1 and the line width W22 of the dark portion L2 of the second pattern light P12. Specifically, the line width W11 of the bright portion L1 and the line width W12 of the dark portion L2 of the first pattern light P11 are both 100 μm, and the line width W21 of the bright portion L1 and the line width W22 of the dark portion L2 of the second pattern light P12 are both 80 μm. Therefore, in the example of FIG. 11, of the lattice pattern, the vertical stripe pattern is wider than the horizontal stripe pattern.

In short, the stripe patterns include a first stripe pattern (vertical stripe pattern) and a second stripe pattern (horizontal stripe pattern) which are orthogonal to each other. The width of at least one of the bright portion L1 and the dark portion L2 is different between the first stripe pattern and the second stripe pattern. This makes it possible to identify the fiber direction of the sheet Sh1 in addition to the asperity information. In the example of FIG. 11, the first stripe pattern is wider than the second stripe pattern for both the bright portion L1 and the dark portion L2, but the present disclosure is not limited to this example, and the first stripe pattern may be wider than the second stripe pattern for only the bright portion L1 or only the dark portion L2. In addition, the second stripe pattern may be wider than the first stripe pattern for at least one of the bright portion L1 and the dark portion L2.

In addition, the pattern light P1 that produces the above-described lattice pattern may be realized using a lattice-shaped shield 32 or two shields 32 in which slits 321 are formed. In the latter case, the lattice pattern as shown in FIG. 11 can be realized by stacking two shields 32 having slits 321 with different widths such that the orientations of their slits 321 are orthogonal to each other.

When the pattern light P1 of such a lattice pattern is used, the control portion 16 can analyze the line width of the second stripe pattern (horizontal stripe pattern) in addition to the line width of the first stripe pattern (vertical stripe pattern) when analyzing the identification image Im1. That is, the control portion 16 can calculate the variation in the line width in the horizontal direction from the first stripe pattern, and can calculate the variation in the line width in the vertical direction from the second stripe pattern. In this way, it is possible to acquire at one time the identification image Im1 required for the analysis in the two directions, i.e., the vertical direction and the horizontal direction, orthogonal to each other. In this case, since the identification image Im1 cannot be acquired and analyzed for each row, the entire identification image Im1 needs to be stored in the memory; however, comparison of the calculation result for the vertical direction with the calculation result for the horizontal direction enables identification of the fiber direction.

That is, the control portion 16 can identify the fiber direction of the surface A1 of the sheet Sh1 by the direction identification portion 24 based on the difference between the calculation result for the vertical direction and the calculation result for the horizontal direction. In the example of FIG. 11, since the line widths W11 and W12 of the first pattern light P11, which projects the first stripe pattern (vertical stripe pattern), are 100 μm or more, the asperity information for the horizontal direction calculated from the first pattern light P11 is regarded as "independent of the fiber direction". On the other hand, since the line widths W21 and W22 of the second pattern light P12, which projects the second stripe pattern (horizontal stripe pattern), are less than 100 μm, the asperity information for the vertical direction calculated from the second pattern light P12 is regarded as "dependent on the fiber direction".

Therefore, when the same result (asperity information) is obtained for the vertical direction and the horizontal direction, the direction identification portion 24 determines that the fiber direction is orthogonal to the second stripe pattern (horizontal stripe pattern) produced by the second pattern light P12. In other words, it is determined that the fiber direction is the same as the arrangement direction of the bright portion L1 and the dark portion L2 of the second pattern light P12. On the other hand, when different results (asperity information) are obtained for the vertical direction and the horizontal direction, the direction identification portion 24 determines that the fiber direction is along the second stripe pattern (horizontal stripe pattern) produced by the second pattern light P12. In other words, it is determined that the fiber direction is orthogonal to the arrangement direction of the bright portion L1 and the dark portion L2 of the second pattern light P12. Here, whether the asperity information is the same for the vertical direction and the horizontal direction is determined by whether the difference between the asperity information for the vertical direction and the asperity information for the horizontal direction is less than or equal to a predetermined value, and when the difference is less than or equal to the predetermined value, it is determined that the asperity information is the same for the vertical direction and the horizontal direction.

In this way, by narrowing the line width of only one of the stripe patterns of the lattice pattern to obtain the asperity information "dependent on the fiber direction", both the asperity information and the fiber direction can be identified from the identification image Im1. When the fiber direction is identified, for example, the inkjet type image forming portion 13 can predict the curl direction in accordance with the fiber direction, and the condition determination portion 23 can perform curl correction.

[8] Fiber Direction Identification Method

Next, a method for identifying the fiber direction on the surface A1 of the sheet Sh1 from the identification image Im1 will be described with reference to FIG. 12 to FIG. 18.

The sheet identification device 2 of the image processing apparatus 10 according to the present embodiment uses the dependence of the pattern light P1 on the fiber direction to identify the fiber direction from the identification image Im1. That is, the method for identifying the fiber direction to be described below is basically the same as the method described in the section of "[7] Lattice Pattern". Therefore, unless otherwise noted, the configuration to be described below is also applicable to the case where the pattern light P1 that produces a lattice pattern is used.

[8.1] Mode of Pattern Light

Figure 12:
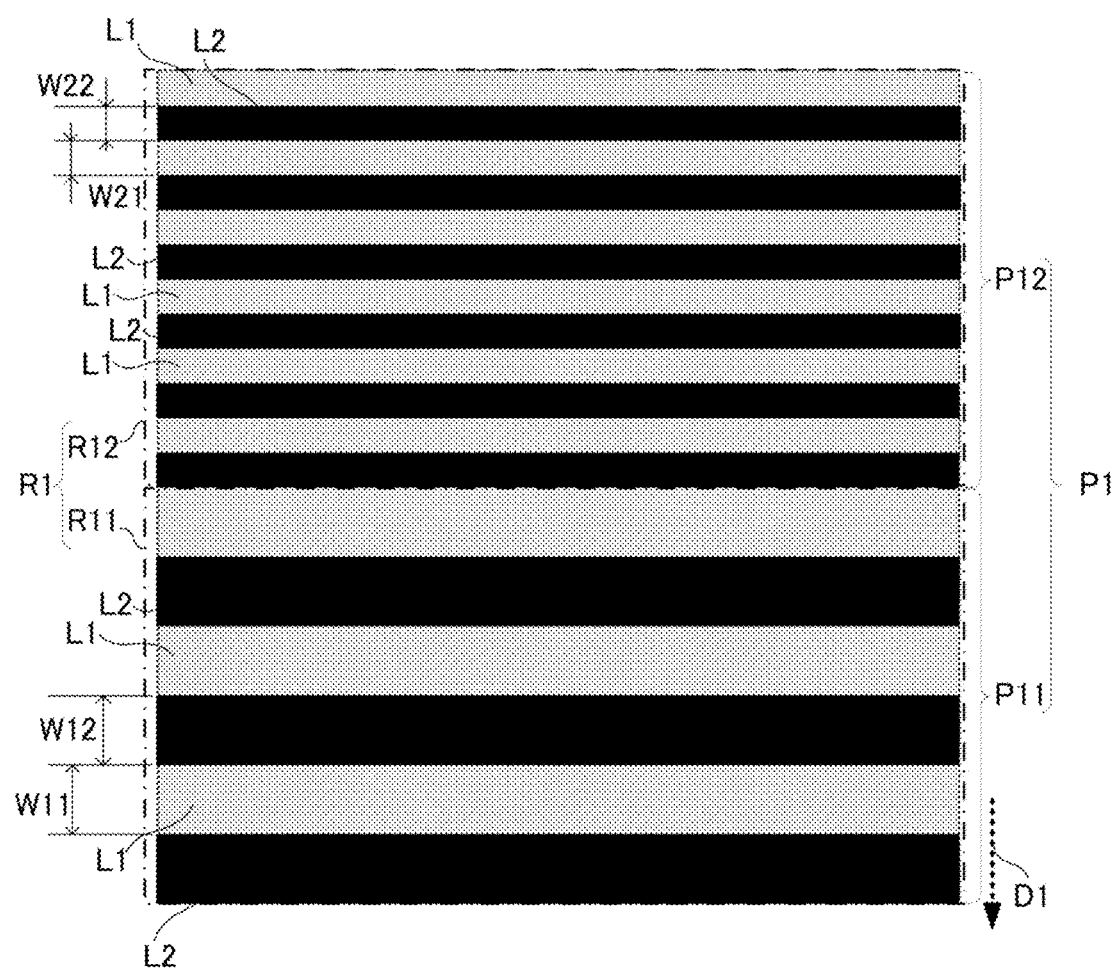
FIG. 12 is a schematic diagram showing one mode of pattern light used in the sheet identification device according to the first embodiment.

Here, as an example, as shown in FIG. 12, the sheet identification device 2 uses the pattern light P1 including the first pattern light P11 and the second pattern light P12 having different dependences on the fiber direction to identify the fiber direction. That is, when forming the identification image Im1, the light irradiation portion 3 projects the first pattern light P11 and the second pattern light P12 having different dependences on the fiber direction of the surface A1 of the sheet Sh1 on the identification region R1.

In the example of FIG. 12, the first pattern light P11 and the second pattern light P12 both form a stripe pattern in which a bright portion L1 and a dark portion L2 are alternately arranged on the identification region R1. Here, as an example, for both the first pattern light P11 and the second pattern light P12, a linear bright portion L1 and a linear dark portion L2, which are orthogonal to the conveying direction D1 of the sheet Sh1, are arranged alternately in the conveying direction D1. Here, the line width of the first pattern light P11 and the line width of the second pattern light P12 are different from each other. In the example of FIG. 12, the line width W11 of the bright portion L1 and the line width W12 of the dark portion L2 of the first pattern light P11 are larger than the line width W21 of the bright portion L1 and the line width W22 of the dark portion L2 of the second pattern light P12. Specifically, the line width W11 of the bright portion L1 and the line width W12 of the dark portion L2 of the first pattern light P11 are both 100 μm, and the line width W21 of the bright portion L1 and the line width W22 of the dark portion L2 of the second pattern light P12 are both 50 μm.

Here, the identification region R1 is divided into a first small region R11 and a second small region R12 in a direction orthogonal to the extending direction of the bright portion L1 and the dark portion L2, that is, in the arrangement direction of the bright portion L1 and the dark portion L2. In other words, the identification region R1 includes the first small region R11 and the second small region R12 sectioned in the conveying direction D1. The first pattern light P11 is projected on the first small region R11 of the identification region R1, and the second pattern light P12 is projected on the second small region R12 of the identification region R1. In the example of FIG. 12, the identification region R1 is divided into two equal parts in the conveying direction D1, and a region on the downstream side in the conveying direction D1 (the lower side in FIG. 12) is the first small region R11, and a region on the upstream side in the conveying direction D1 (the upper side in FIG. 12) is the second small region R12. That is, in the example of FIG. 12, the first pattern light P11 and the second pattern light P12 are projected on different regions (the first small region R11 and the second small region R12) in the identification region R1.

According to the above configuration, the asperity information that is "independent of the fiber direction" can be calculated from the identification image Im1 of the first small region R11 on which the first pattern light P11 having a line width of 100 μm or more is projected. On the other hand, the asperity information that is "dependent on the fiber direction" can be calculated from the identification image Im1 of the second small region R12 on which the second pattern light P12 having a line width of less than 100 μm is projected. Therefore, the control portion 16 (direction identification portion 24) can identify the fiber direction by comparing the calculation result of the asperity information by the first pattern light P11 with the calculation result of the asperity information by the second pattern light P12.

In the example of FIG. 12, the first stripe pattern is wider than the second stripe pattern for both the bright portion L1 and the dark portion L2, but the present disclosure is not limited to this example, and the first stripe pattern may be wider than the second stripe pattern for only the bright portion L1 or only the dark portion L2. In addition, the second stripe pattern may be wider than the first stripe pattern for at least one of the bright portion L1 and the dark portion L2. In addition, the above-described line widths are mere examples, and at least one of the line width W11 of the bright portion L1 and the line width W12 of the dark portion L2 of the first pattern light P11 is not limited to 100 μm, and may be, for example, a value larger than 100 μm, such as 120 μm, 140 μm, or 160 μm. Similarly, at least one of the line width W11 of the bright portion L1 and the line width W12 of the dark portion L2 of the second pattern light P12 is not limited to 50 μm, and may be, for example, a value smaller than 50 μm such as 40 μm or a value larger than 50 μm such as 60 μm.

[8.2] Specific Processing

Figure 13:
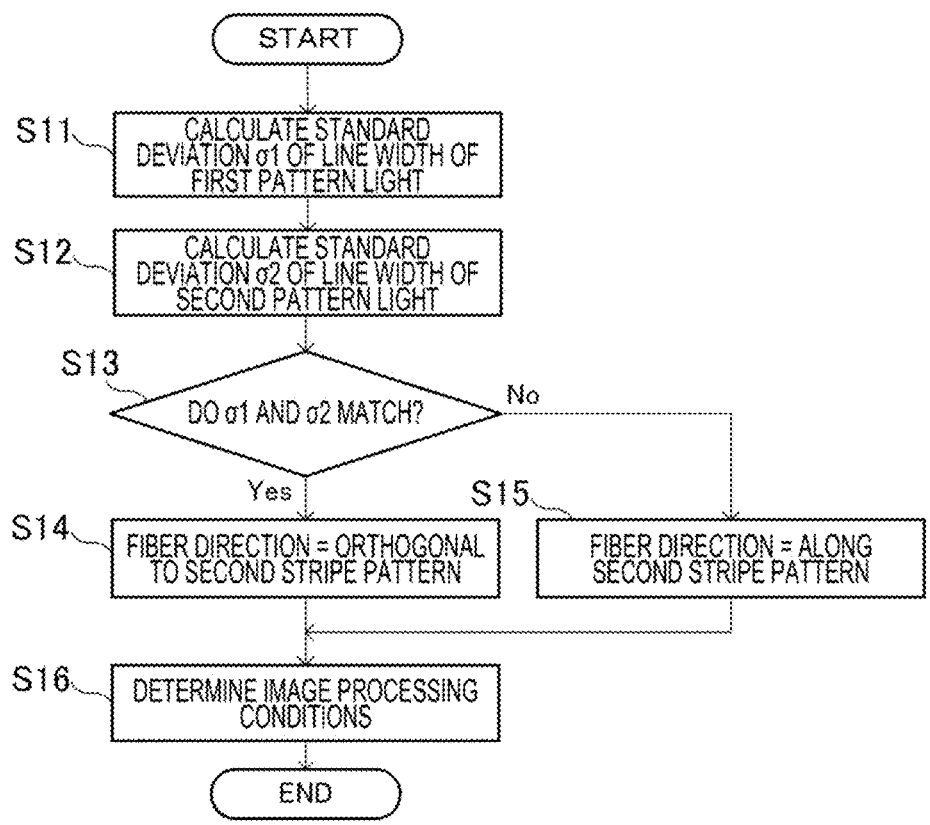
FIG. 13 is a flowchart of an example operation of the sheet identification device according to the first embodiment.

Next, specific processing for identifying fiber information based on the identification image Im1 by the direction identification portion 24 will be described with reference to FIG. 13. Steps S11, S12, . . . in the flowchart shown in FIG. 13 represent the numbers of the processing procedure (steps) executed by the control portion 16.

<Steps S11 and S12>

In step S11, the control portion 16 calculates, at the asperity identification portion 22, the standard deviation 61 of the line width of the first pattern light P11. In step S12, the control portion 16 calculates, at the asperity identification portion 22, the standard deviation σ2 of the line width of the second pattern light P12. Here, in order to obtain the standard deviations 61 and σ2, processing similar to that described with reference to the flowchart of FIG. 7 (in particular, steps S1 to S8) is specifically performed. In this way, the standard deviation 61 as the asperity information that is "independent of the fiber direction" and the standard deviation σ2 as the asperity information that is "dependent on the fiber direction" are derived.

<Step S13>

In step S13, the control portion 16 compares the standard deviation 61 of the line width of the first pattern light P11 with the standard deviation σ2 of the line width of the second pattern light P12 to determine whether the standard deviation σ1 and the standard deviation σ2 match. At this time, the control portion 16 compares, at the direction identification portion 24, the magnitude of the standard deviation σ1 with the magnitude of a value obtained by adding a predetermined value α to the standard deviation σ2. When the standard deviation σ1 is smaller than the value obtained by adding the predetermined value α to the standard deviation σ2, the direction identification portion 24 determines that the standard deviation σ1 matches the standard deviation σ2 (S13: Yes), and shifts the processing to step S14. When the standard deviation σ1 is larger than the value obtained by adding the predetermined value α to the standard deviation σ2, the direction identification portion 24 determines that the standard deviation σ1 does not match the standard deviation σ2 (S13: No), and shifts the processing to step S15.

The predetermined value α is, for example, a value determined based on the magnitude of the standard deviations σ1 and σ2, or a predetermined value. By using the value obtained by adding the predetermined value α to the standard deviation σ2 as a value to be compared with the standard deviation σ1, even when there is some difference between the standard deviation σ1 and the standard deviation σ2, if the difference is the predetermined value α or less, the standard deviation σ1 and the standard deviation σ2 can be considered to match. That is, the predetermined value α can absorb some difference between the standard deviation σ1 and the standard deviation σ2.

<Steps S14 and S15>

In step S14, the control portion 16 determines at the direction identification portion 24 that the fiber direction is orthogonal to the second stripe pattern. That is, when the same result (asperity information) is obtained for the first pattern light P11 and the second pattern light P12, the direction identification portion 24 determines that the fiber direction is orthogonal to the second stripe pattern produced by the second pattern light P12. In other words, it is determined that the fiber direction is the same as the arrangement direction of the bright portion L1 and the dark portion L2 of the second pattern light P12 (the conveying direction D1 in the example of FIG. 12). In short, since the asperity information that is "independent of the fiber direction" and the asperity information that is "dependent on the fiber direction" match, it is identified that the asperities on the surface A1 are reflected in the second stripe pattern produced by the second pattern light P12, that is, the second stripe pattern is orthogonal to the fiber direction.

On the other hand, in step S15, the control portion 16 determines at the direction identification portion 24 that the fiber direction is along the second stripe pattern. That is, when different results (asperity information) are obtained for the first pattern light P11 and the second pattern light P12, the direction identification portion 24 determines that the fiber direction is along the second stripe pattern produced by the second pattern light P12. In other words, it is determined that the fiber direction is orthogonal to the arrangement direction of the bright portion L1 and the dark portion L2 of the second pattern light P12 (the conveying direction D1 in the example of FIG. 12). In short, since the asperity information that is "independent of the fiber direction" and the asperity information that is "dependent on the fiber direction" do not match, it is identified that the asperities on the surface A1 are not reflected in the second stripe pattern produced by the second pattern light P12, that is, the second stripe pattern is along the fiber direction.

<Step S16>

In step S16, the control portion 16 determines, at the condition determination portion 23, image processing conditions. That is, the condition determination portion 23 determines the image processing conditions including image forming conditions in accordance with the fiber direction identified in steps S14 and S15. As an example, the condition determination portion 23 predicts the curl direction in accordance with the identified fiber direction, and sets image processing conditions for curl correction. Thus, when an image is formed on the sheet Sh1 by the image forming portion 13, the image forming conditions corresponding to the fiber direction of the surface A1 of the sheet Sh1 are automatically applied.

The procedure of the fiber direction identification method described above is merely an example, and the order of the processes shown in the flowchart of FIG. 13 may be changed as appropriate.

[8.3] Summary

As described above, in the present embodiment, the pattern light P1 includes the first pattern light P11 and the second pattern light P12 having different dependences on the fiber direction. In this case, the direction identification portion 24 identifies the fiber direction based on the comparison result between the first pattern light P11 and the second pattern light P12 in the identification image Im1. Thus, the fiber direction can be identified by relatively simple processing using the dependences of the first pattern light P11 and the second pattern light P12 on the fiber direction.

In addition, in the example of FIG. 12, as in the case of the lattice pattern, the first pattern light P11 and the second pattern light P12 have different line widths on the identification region R1 and thus have different dependences on the fiber direction. Accordingly, the first pattern light P11 and the second pattern light P12 having different dependences on the fiber direction can be realized relatively easily. Further, the line width of the first pattern light P11 on the identification region R1 is 100 μm or more, and the line width of the second pattern light P12 on the identification region R1 is less than 100 μm. Thus, the asperity information calculated from the first pattern light P11 can be regarded as "independent of the fiber direction", and the asperity information calculated from the second pattern light P12 can be regarded as "dependent on the fiber direction".

In addition, in the example of FIG. 12, as in the case of the lattice pattern, the direction identification portion 24 identifies the fiber direction based at least on the comparison result between the variation in the line width of the first pattern light P11 and the variation in the line width of the second pattern light P12 on the identification region R1. Thus, the fiber direction can be identified by a relatively simple arithmetic operation of calculating the variation in the line width. In addition, the first pattern light P11 and the second pattern light P12 both form a stripe pattern in which a bright portion L1 and a dark portion L2 are alternately arranged on the identification region R1. Thus, deformation, distortion, or the like according to the asperities on the surface A1 is likely to appear in the stripe pattern on the identification region R1.

On the other hand, the following two points are different from the lattice pattern in the pattern light P1 illustrated in FIG. 12. That is, as the first difference, in the example of FIG. 12, the arrangement direction of the bright portion L1 and the dark portion L2 is the same for the first pattern light P11 and the second pattern light P12. This makes it easy to ensure the lengths of both the bright portion L1 and the dark portion L2 in the first pattern light P11 and the second pattern light P12. As the second difference, in the example of FIG. 12, the identification region R1 is divided into the first small region R11 on which the first pattern light P11 is projected and the second small region R12 on which the second pattern light P12 is projected. Thus, the first pattern light P11 and the second pattern light P12 can be easily distinguished from each other, so that the fiber direction can be easily identified based on the comparison result between the first pattern light P11 and the second pattern light P12 in the identification image Im1.

[8.4] Other Modes of Pattern Light

Below are examples of other modes of the pattern light P1 used for identifying the fiber direction. Descriptions of the points similar to those of the pattern light P1 shown in FIG. 12 will be omitted as appropriate.

Figure 14:
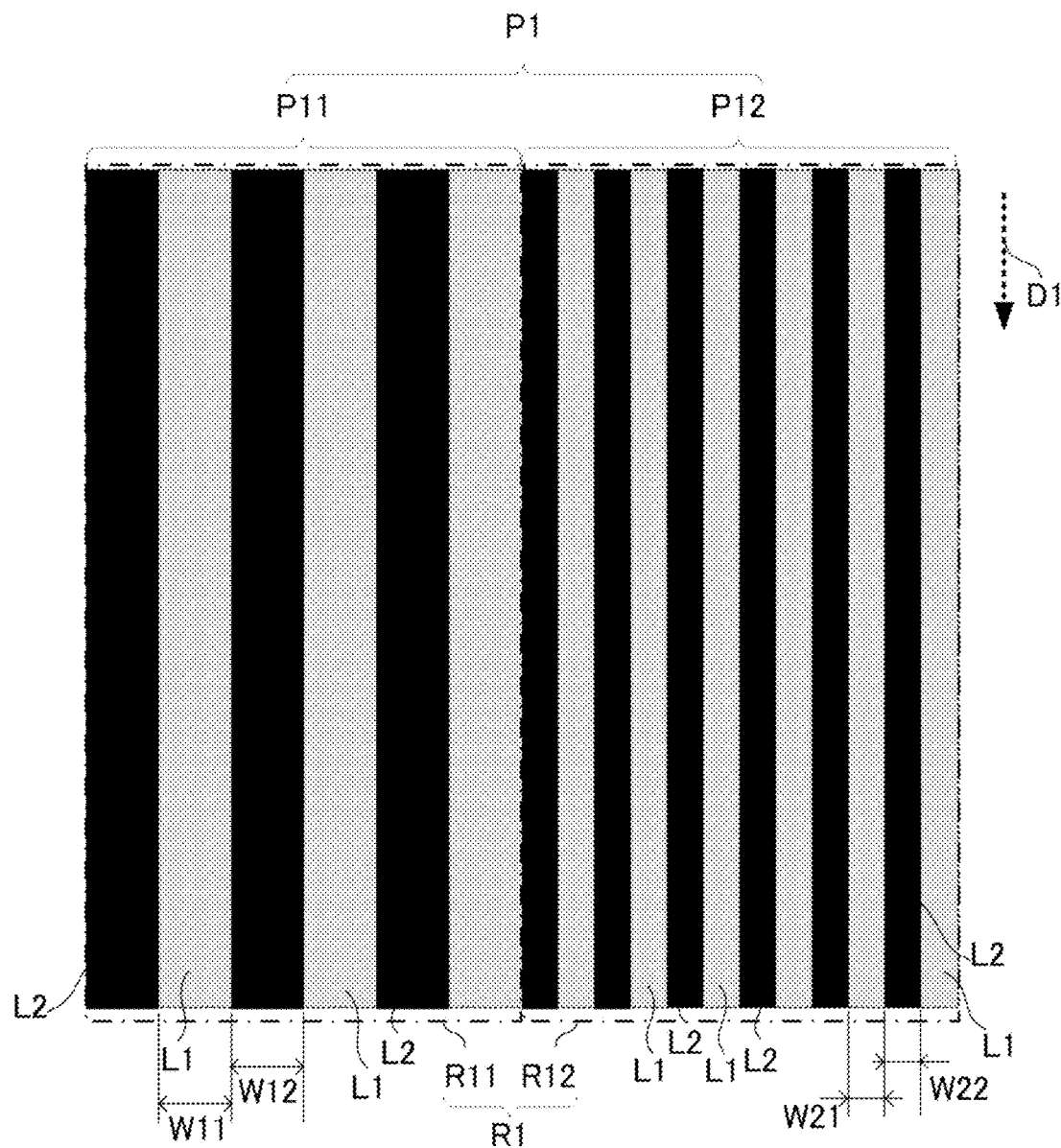
FIG. 14 is a schematic diagram showing one mode of pattern light used in the sheet identification device according to the first embodiment.

In the case of the pattern light P1 shown in FIG. 14, a linear bright portion L1 and a linear dark portion L2, which are orthogonal to the conveying direction D1 of the sheet Sh1, are arranged alternately in a direction orthogonal to the conveying direction D1 for both the first pattern light P11 and the second pattern light P12. The identification region R1 includes the first small region R11 and the second small region R12 sectioned in the direction orthogonal to the conveying direction D1, and the first pattern light P11 is projected on the first small region R11 and the second pattern light P12 is projected on the second small region R12.

Figure 15:
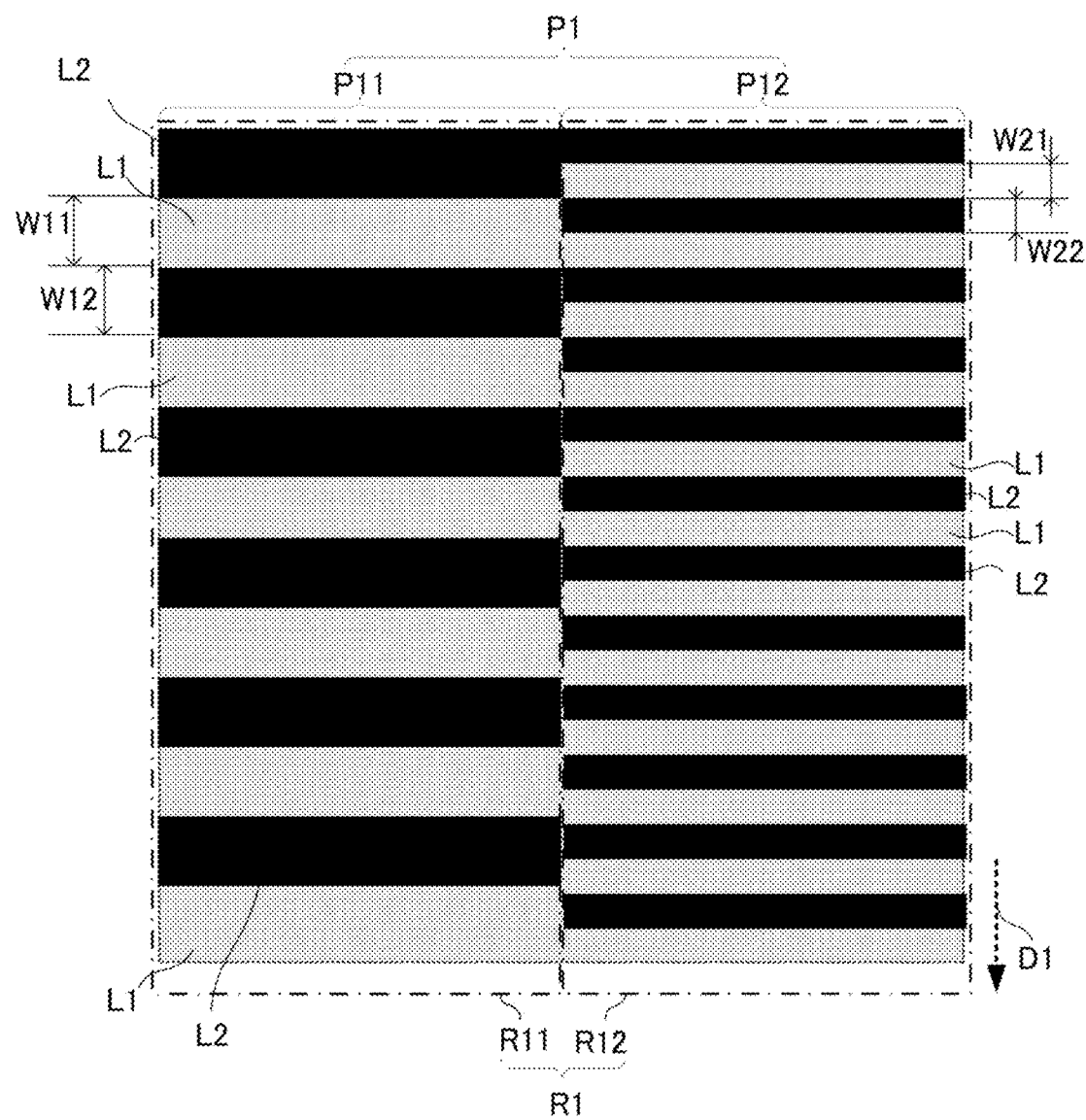
FIG. 15 is a schematic diagram showing one mode of pattern light used in the sheet identification device according to the first embodiment.

In the mode shown in FIG. 15, the identification region R1 is divided into the first small region R11 and the second small region R12 in the extending direction of the bright portion L1 and the dark portion L2, that is, in the direction orthogonal to the arrangement direction of the bright portion L1 and the dark portion L2. In other words, the identification region R1 includes the first small region R11 and the second small region R12 sectioned in the direction orthogonal to the conveying direction D1, and the first pattern light P11 is projected on the first small region R11 and the second pattern light P12 is projected on the second small region R12.

Figure 16:
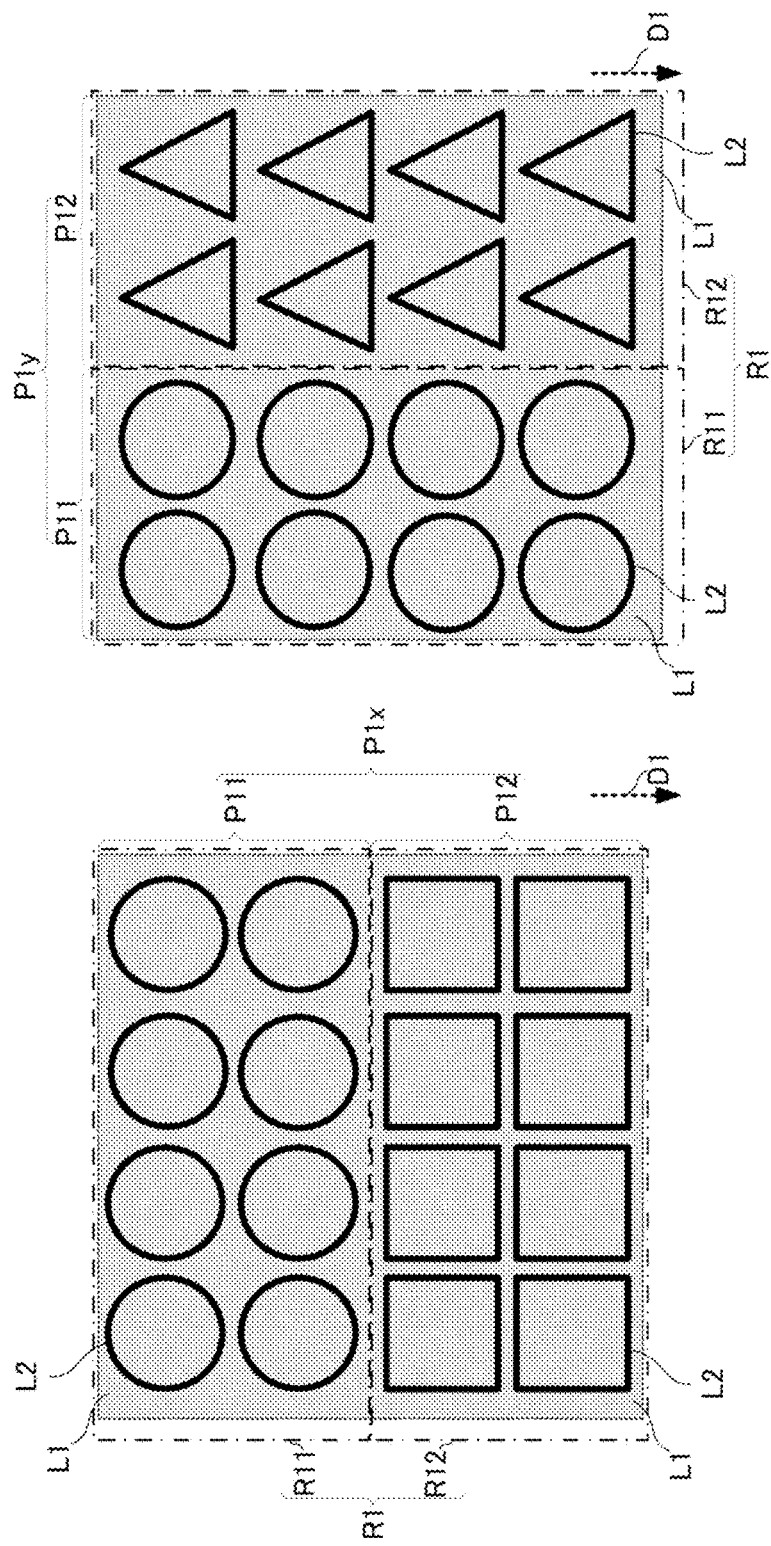
FIG. 16 is a schematic diagram showing one mode of pattern light used in the sheet identification device according to the first embodiment.

In the case of pattern lights P1x and P1y shown in FIG. 16, the first pattern light P11 and the second pattern light P12 both form a graphic pattern, not a stripe pattern, on the identification region R1. Here, in the case of the pattern light P1x shown on the left side of FIG. 16, the first pattern light P11 forms a graphic pattern in which a plurality of circular shapes are formed by the dark portion L2 in the bright portion L1, and the second pattern light P12 forms a graphic pattern in which a plurality of square shapes are formed by the dark portion L2 in the bright portion L1. In the case of the pattern light P1y shown on the right side of FIG. 16, the first pattern light P11 forms a graphic pattern in which a plurality of circular shapes are formed by the dark portion L2 in the bright portion L1, and the second pattern light P12 forms a graphic pattern in which a plurality of triangular shapes are formed by the dark portion L2 in the bright portion L1. In the case of the pattern light P1x, the identification region R1 is divided into the first small region R11 and the second small region R12 in the conveying direction D1, and in the case of the pattern light P1y, the identification region R1 is divided into the first small region R11 and the second small region R12 in the direction orthogonal to the conveying direction D1. In the case of either the pattern light P1x or P1y, the first pattern light P11 and the second pattern light P12 have different dependences on the fiber direction. Further, in the cases of graphic patterns, the relationship between the bright portion L1 and the dark portion L2 may be reversed, for example, the graphic pattern may be formed by the bright portion L1 in the dark portion L2.

In the cases of the pattern lights P1a to P1g shown in FIG. 17 and FIG. 18, the first pattern light P1i and the second pattern light P12 having different thicknesses (line widths) are mixed. In all the cases of the pattern lights P1a to P1g, a linear bright portion L1 and a linear dark portion L2, which are orthogonal to the conveying direction D1 of the sheet Sh1, are arranged alternately in the conveying direction D1. Here, as in the example of FIG. 12, the line width W11 of the bright portion L1 and the line width W12 of the dark portion L2 of the first pattern light P1i are both 100 μm, and the line width W21 of the bright portion L1 and the line width W22 of the dark portion L2 of the second pattern light P12 are both 50 μm.

In the cases of the pattern lights P1a to P1c shown in FIG. 17, the total number of stripes is the same in the thick (the line width is 100 μm) stripe pattern and the thin (the line width is 50 μm) stripe pattern. That is, for example, in the case of the pattern light P1a, the total number of bright portions L1 and dark portions L2 of the first pattern light P1i is four, and the total number of bright portions L1 and dark portions L2 of the second pattern light P12 is also four. In these examples, the leading portion in the conveying direction D1 is the dark portion L2, but the leading portion may be the bright portion L1.

On the other hand, in the case of the pattern light Ptd shown in FIG. 18, the total number of bright portions L1 and dark portions L2 of the first pattern light P11 which constitute the thick stripe pattern is three, and the total number of bright portions L1 and dark portions L2 of the second pattern light P12 which constitute the thin stripe pattern is two. In the case of the pattern light P1e shown in FIG. 18, the total number of bright portions L1 and dark portions L2 of the first pattern light P1i which constitute the thick stripe pattern is two, and the total number of bright portions L1 and dark portions L2 of the second pattern light P12 which constitute the thin stripe pattern is three. Further, in the case of the pattern light P1f shown in FIG. 18, the total number of bright portions L1 and dark portions L2 of the first pattern light P1i which constitute the thick stripe pattern is three, and the total number of bright portions L1 and dark portions L2 of the second pattern light P12 which constitute the thin stripe pattern is one. In the case of the pattern light P1g shown in FIG. 18, the total number of bright portions L1 and dark portions L2 of the first pattern light P1i which constitute the thick stripe pattern is one, and the total number of bright portions L1 and dark portions L2 of the second pattern light P12 which constitute the thin stripe pattern is three.

As described above, when the total numbers of stripe patterns having different line widths are different, the numbers of line width data items obtained from the respective stripe patterns are also different, which affects the reliability of the data and the measurement accuracy. In the examples of FIG. 17 and FIG. 18, the measurement accuracy is highest in the cases of the pattern lights P1a to P1c, in which the total numbers are the same, second highest in the cases of the pattern lights P1d and P1e, and lowest in the cases of the pattern lights P1f and P1g, in which the difference in the total number is the largest.

The pattern lights P1 shown in FIG. 12 and FIG. 14 to FIG. 18 are merely examples, and the specific mode of the pattern light P1 for identifying the fiber direction on the surface A1 of the sheet Sh1 can be changed as appropriate. In any pattern light P1, the line width is set within a range in which image identification is possible.

[9] Modifications

The plurality of constituent elements included in the image processing apparatus 10 may be distributed across a plurality of housings. For example, at least one of the acquisition portion 21, the asperity identification portion 22, the condition determination portion 23, the direction identification portion 24, the thickness identification portion 25, and the like, which are constituent elements of the sheet identification device 2, is not necessarily be realized as a function of the control portion 16, and may be provided in a separate housing from the control portion 16. That is, the sheet identification device 2 need not necessarily be integrated with the image processing apparatus 10, and at least a part of the sheet identification device 2 may be provided in a separate housing from the image processing apparatus 10.

In addition, the sheet identification device 2 need to have at least the function of identifying the fiber direction of the surface A1 of the sheet Sh1, and the functions of identifying the asperity information on the asperities on the surface A1 of the sheet Sh1, the thickness of the sheet Sh1, and the like may be omitted as appropriate. For example, when the function of identifying the thickness of the sheet Sh1 is omitted, the thickness sensor 5 and the thickness identification portion 25 may be omitted.

In addition, in the first embodiment, an example is shown in which the optical axis Ax1 of the light irradiation portion 3 is inclined at the predetermined angle θ1 with respect to the identification region R1 of the sheet Sh1, and the optical axis Ax2 of the imaging portion 4 is orthogonal to the identification region R1 of the sheet Sh1, but the present disclosure is not limited to this configuration. For example, the optical axis Ax1 of the light irradiation portion 3 may be orthogonal to the identification region R1 of the sheet Sh1, the optical axis Ax2 of the imaging portion 4 may be inclined with respect to the identification region R1 of the sheet Sh1, or both the optical axis Ax1 and the optical axis Ax2 may be inclined with respect to the identification region R1 of the sheet Sh1.

In addition, the light irradiation portion 3 may include, for example, a projector, and project any pattern light P1 input as projection data on the identification region R1. That is, an image projected from the projector may be projected on the identification region R1 as the pattern light P1. In this case, it is also easy to employ a moving image as the pattern light P1.

In addition, the sheet Sh1 to be irradiated with the pattern light P1 is not limited to the sheet being conveyed, and may be, for example, the sheet Sh1 set in the sheet feed cassette 141. In this case, by moving at least one of the sheet Sh1 and the imaging portion 4 to capture the identification image Im1 in a state where the sheet Sh1 and the imaging portion 4 are relatively moved, a wide area of the sheet Sh1 can be imaged while reducing the image magnification.

Second Embodiment

Figure 19:
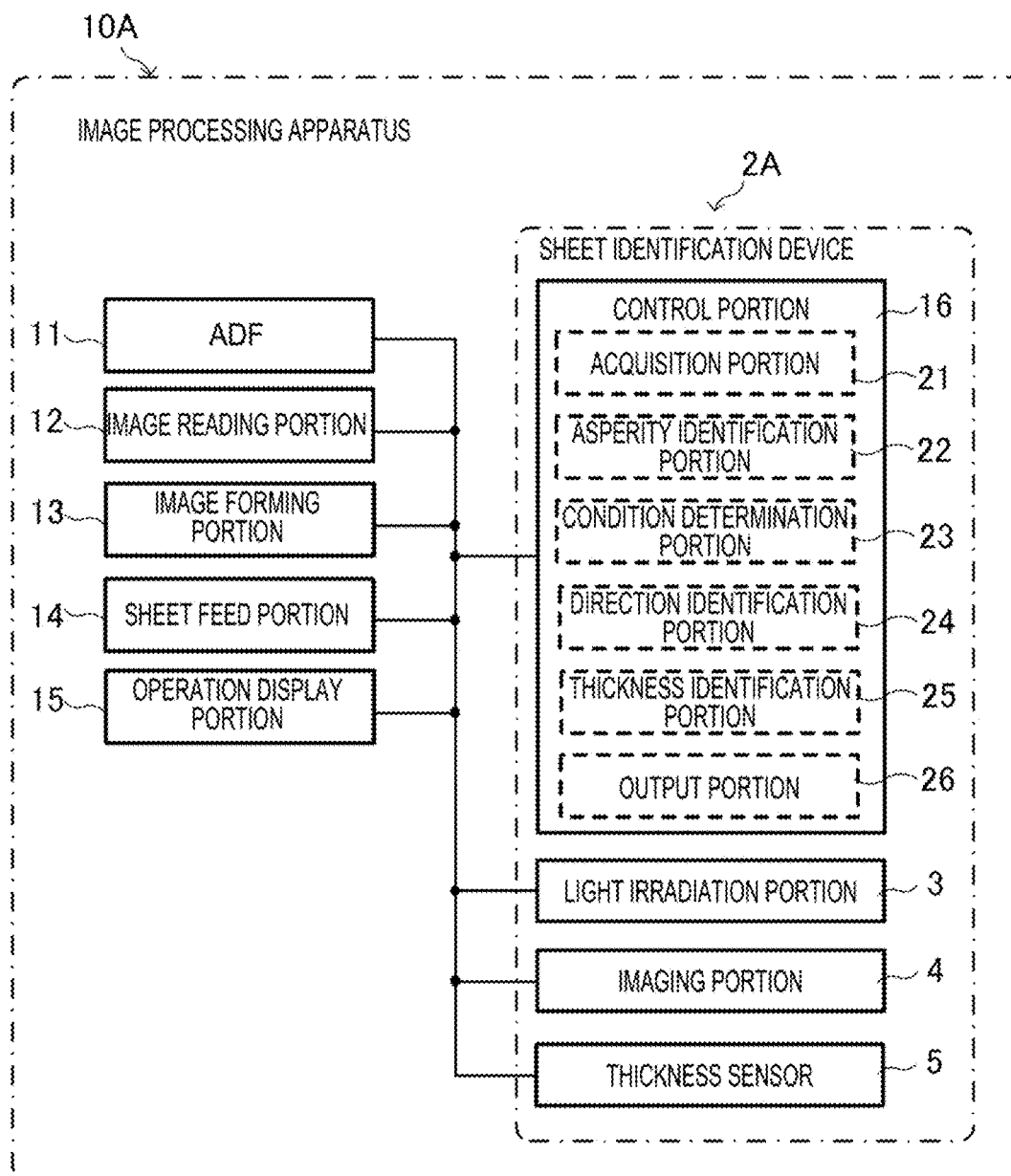
FIG. 19 is a schematic block diagram of an image processing apparatus according to a second embodiment.

The image processing apparatus 10A according to the present embodiment differs from the image processing apparatus 10 according to the first embodiment in that the sheet identification device 2A includes an output portion 26 as shown in FIG. 19. In the following, structures similar to those of the first embodiment are denoted by common reference numerals, and descriptions thereof are omitted as appropriate.

The output portion 26 outputs the identification result of at least one of the asperity identification portion 22, the direction identification portion 24, and the thickness identification portion 25. In the present embodiment, as an example, the output portion 26 outputs the identification result by causing the operation display portion 15 to display the identification result so as to notify the user of the identification result. The mode of the output of the identification result by the output portion 26 is not limited to display on the operation display portion 15, but may be transmission to an external device, writing to a non-temporary recording medium readable by a computer system, or the like. The output portion 26 is provided in the control portion 16 as a function of the control portion 16.

In the case of the identification result of the asperity identification portion 22, what is output from the output portion 26 is, for example, the standard deviation a as the asperity information, the arithmetic average height (Sa), or information representing the type of the sheet Sh1. Similarly, in the case of the identification result of the direction identification portion 24, what is output by the output portion 26 is, for example, the fiber direction, or information indicating "vertical grain" or "horizontal grain".

In addition, the output portion 26 may output information such as a life estimation result, a recommendation for maintenance timing, or a recommendation for the type of the sheet Sh1, which is estimated from the identification result of the asperity identification portion 22 or the like. For example, parts of the image processing apparatus 10A may be worn when the sheet Sh1 is conveyed, but the rougher the surface A1 of the conveyed sheet Sh1, the more likely the wear progresses. That is, since the degree of deterioration of the image processing apparatus 10A differs depending on the surface roughness or the like of the sheet Sh1 used, the accuracy of the life estimation of the image processing apparatus 10A is improved if the asperity information of the sheet Sh1 is known in addition to the number of conveyed sheets Sh1, for example. Therefore, the output portion 26 can output information such as the life estimation result of the image processing apparatus 10A or a recommendation for maintenance timing of the image processing apparatus 10A by, for example, causing the operation display portion 15 to display the information so as to notify the user of the information. Further, in order to extend the life of the image processing apparatus 10A, the output portion 26 can notify the user of information such as a recommendation for the sheet Sh1 having a higher flatness than the sheet Sh1 in use.

In particular, in the sheet identification device 2A according to the present embodiment, as described in the first embodiment, asperity information having a high linearity with the arithmetic average height (Sa) can be calculated. Therefore, even a sheet Sh1 that is not registered in the database or the like in advance can be reflected, for example, in the life estimation of the image processing apparatus 10A.

The output portion 26 may also output information such as the result of estimation on whether the sheet Sh1 faces up or down, which is estimated from the identification result of the asperity identification portion 22. That is, depending on the type of sheet Sh1, the roughness may be different on the front and back sides of the sheet Sh1, such as the back side being rougher than the front side. Therefore, if the asperity information of each of the front and back sides of the sheet Sh1 is known, it is possible to estimate whether the sheet Sh1 faces up or down. Therefore, the output portion 26 can output information such as the result of estimation on whether the sheet Sh1 faces up or down by, for example, causing the operation display portion 15 to display the information so as to notify the user of the information. In this case, it is necessary to capture the identification images Im1 of both sides of the sheet Sh1 in the thickness direction. Therefore, two sensor units 20 may be disposed so as to sandwich the conveying path T1, or one sensor unit 20 may capture the identification images Im1 of both sides using a mirror or the like, or the sheet Sh1 may be turned over.

As a modification of the second embodiment, the condition determination portion 23 may be omitted as appropriate.

The invention claimed is:

1. A sheet identification device comprising:
   a light irradiation portion configured to, when forming an identification image which is an image of an identification region of a surface of a sheet on which image formation or image reading is performed and which is used for identification of a fiber direction of the surface of the sheet, project first pattern light and second pattern light having different dependences on the fiber direction on the identification region,
wherein the first pattern light and the second pattern light have different line widths on the identification region to have different dependences on the fiber direction.

2. The sheet identification device according to claim 1, wherein a line width of the first pattern light on the identification region is 100 µm or more, and a line width of the second pattern light on the identification region is less than 100 µm.

3. The sheet identification device according to claim 1, further comprising:
a condition determination portion configured to determine an image processing condition on the image formation or the image reading, based on the fiber direction.

4. The sheet identification device according to claim 1, wherein a first imaginary straight line connecting the light irradiation portion and a center of the identification region is inclined at a predetermined angle with respect to a second imaginary straight line extending along a conveying direction of the sheet.

5. The sheet identification device according to claim 4, wherein the predetermined angle is 20 degrees or more and 90 degrees or less.

6. The sheet identification device according to claim 1, wherein the first pattern light and the second pattern light both form a stripe pattern in which a bright portion and a dark portion are alternately arranged on the identification region.

7. The sheet identification device according to claim 6, wherein a direction in which the bright portion and the dark portion are arranged is identical for the first pattern light and the second pattern light.

8. The sheet identification device according to claim 1, wherein the identification region is divided into a first small region on which the first pattern light is projected and a second small region on which the second pattern light is projected.

9. The sheet identification device according to claim 1, wherein the light irradiation portion includes:
a light source; and
a shield configured to block part of light output from the light source to allow the first pattern light and the second pattern light to pass therethrough.

10. An image processing apparatus comprising:
the sheet identification device according to claim 1; and
an image processing portion configured to execute at least one of the image formation and the image reading on the sheet.

11. A sheet identification device comprising:
an acquisition portion configured to acquire an identification image which is an image of an identification region on which pattern light is projected of a surface of a sheet on which image formation or image reading is performed; and
a direction identification portion configured to identify a fiber direction of the surface of the sheet, based on the identification image,
wherein:
the pattern light includes first pattern light and second pattern light having different dependences on the fiber direction,
the direction identification portion identifies the fiber direction based on a comparison result between the first pattern light and the second pattern light in the identification image, and
the first pattern light and the second pattern light have different line widths on the identification region to have different dependences on the fiber direction.

12. The sheet identification device according to claim 11, wherein a line width of the first pattern light on the identification region is 100 µm or more, and a line width of the second pattern light on the identification region is less than 100 µm.

13. The sheet identification device according to claim 11, further comprising:
a condition determination portion configured to determine an image processing condition on the image formation or the image reading, based on the fiber direction.

14. The sheet identification device according to claim 11, further comprising:
an asperity identification portion configured to identify asperity information on asperities on the surface of the sheet, based on the identification image.

15. A sheet identification device comprising:
an acquisition portion configured to acquire an identification image which is an image of an identification region on which pattern light is projected of a surface of a sheet on which image formation or image reading is performed; and
a direction identification portion configured to identify a fiber direction of the surface of the sheet, based on the identification image,
wherein:
the pattern light includes first pattern light and second pattern light having different dependences on the fiber direction,
the direction identification portion identifies the fiber direction based on a comparison result between the first pattern light and the second pattern light in the identification image, and
the direction identification portion identifies the fiber direction, based at least on a comparison result between a variation in a line width of the first pattern light and a variation in a line width of the second pattern light on the identification region.

* * * * *